(12) United States Patent
Cheng et al.

(10) Patent No.: US 8,451,419 B2
(45) Date of Patent: May 28, 2013

(54) TOUCH PANEL AND METHOD FOR MANUFACTURING THE SAME

(75) Inventors: Tsung-Chin Cheng, Hsinchu (TW); Zeng-De Chen, Hsinchu (TW); Seok-Lyul Lee, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 793 days.

(21) Appl. No.: 12/630,011

(22) Filed: Dec. 3, 2009

(65) Prior Publication Data

US 2010/0309151 A1    Dec. 9, 2010

(30) Foreign Application Priority Data

Jun. 4, 2009 (TW) ................................ 98118499 A

(51) Int. Cl.
*G02F 1/1339* (2006.01)
(52) U.S. Cl.
USPC ............................ 349/157; 349/156; 349/155
(58) Field of Classification Search
USPC ................................................ 349/155–157
See application file for complete search history.

(56) References Cited

U.S. PATENT DOCUMENTS

| | | | |
|---|---|---|---|
| 6,501,529 B1 * | 12/2002 | Kurihara et al. | 349/160 |
| 2001/0007488 A1 * | 7/2001 | Sawada | 349/106 |
| 2006/0158600 A1 * | 7/2006 | Mun et al. | 349/156 |
| 2007/0195029 A1 * | 8/2007 | Jeon et al. | 345/87 |

* cited by examiner

*Primary Examiner* — Wen-Ying P Chen
(74) *Attorney, Agent, or Firm* — McClure, Qualey & Rodack, LLP

(57) ABSTRACT

A touch panel and methods for manufacturing the same is provided. The method for manufacturing a touch panel includes providing a substrate and forming a photospacer layer on the substrate. Subsequently, a single lithography process is performed to the photospacer layer to define a main spacer and a sensor spacer. After forming a conductive layer on the main spacers and sensor spacers, a part of the conductive layer is removed to expose a top part and a part of a upper side of the main spacer. Accordingly, the conductive layer on the top part of the main spacer can be completely removed. In addition, the aperture ratio loss due to over-etching the conductive layer on the color filter can be prevented by the conductive layer remained on a lower side of the main spacer.

17 Claims, 24 Drawing Sheets

TOUCH PANEL AND METHOD FOR MANUFACTURING THE SAME

CROSS REFERENCE TO RELATED APPLICATIONS

This Application claims priority of Taiwan Patent Application No. 098118499, filed on Jun. 4, 2009, the entirety of which is incorporated by reference herein.

BACKGROUND OF THE DISCLOSURE

1. Field of the Disclosure

The present disclosure relates to touch panels, and in particular relates to the main spacer and the sensor spacer thereof and methods for manufacturing the same.

2. Description of the Related Art

Many input devices such as key board/mouse/trackball or recently key board/mouse/touch panel are integrated into single, commercially available, electronic products, thereby largely improving the input efficiency and convenience thereof. The developmental trend of electronic products towards to be light, thin, short, small, and multifunctional. It is difficult to integrate many input devices into one electronic product. However, touch panels may simultaneously include several operating functions applied by input devices such as oard, mouse, or others (e.g. handwriting recognition). Compared to the conventional input devices, touch panels offer not only input functions but also output functions. Accordingly, touch panels are currently considered a mature and stable technology, to be employed as an input device. Additionally, because of its advantageous characteristics, touch panels are the top choice selected by the industry designer to develop related displays for human-machine interface. For example, touch panels are widely applied as input devices in personal digital assistances (PDA), e-books, mobile phones, laptop computers, and global positioning systems (GPS).

Referring to the driving modes of touch panels, they are categorized into resistive type, capacitive type, sonic type, optical waveguide type, load weight change type, and the likes. Resistive touch panels are currently one of the most applied touch panels in commercial products, and their designs are further separated into four lines, five lines, six lines, and the likes; often distinguished by companies.

FIG. 1A shows a cross section of a conventional touch panel. The top substrate of the touch panel 100 is a color filter substrate 10A, and the bottom substrate thereof is an array substrate 10B. The color filter substrate 10A includes a substrate 20, a color filter 22, a black matrix 24, an overcoat layer 26, a main spacer 11, a sensor spacer 15, and a conductive layer 19. The array substrate 10B includes a substrate 20, a first metal layer 101, a gate insulation layer 103, a semiconductor layer 105 made of material such as amorphous silicon or n-type doped amorphous silicon, a second metal layer 107, a protection layer 109, a contact pad 17A, and a pixel electrode 17B made of material such as indium tin oxide. The array substrate 10B further includes a stacked structure 13 sequentially constituted from bottom to top as: the first metal layer 101, the gate insulation layer 203, the semiconductor layer 105, the second metal layer 107, and the protection layer 109. The cell gap between the top and bottom substrates 10A and 10B is defined by the total height of the main spacer 11 and the stack structure 13. The contact pad 17A of the array substrate 10B corresponds to the sensor spacer 15 of the color filter substrate 10A. After the formation of the main spacer 11 and the sensor spacer 15 from a single lithography process, the conductive layer 19 is formed on the spacers. In other words, the conductive layer 19 is conformally formed on the spacer (e.g. the main spacer 11 and the sensor spacer 15) surface and the overcoat layer surface. Thus, the spacers do not contact the entire surface of the overcoat layer. Accordingly, when a user presses the touch panel 100, the conductive layer 19 on the sensor spacer 15 will contact the contact pad 17A to input a signal. Note that the surface of the main spacer 11 is covered by the conductive layer 19. Additionally, when a user presses the touch panel, the main spacer 11 in a non-pressed region may easily deviate from a tolerance range A of the stack structure 13 by the physical force to contact a nearby pixel electrode 17B. In this case, unexpected bright points would be produced due to shorting. Increasing the area of the stack structure 13 may solve the described problem, but the aspect ratio of the touch panel would concurrently decrease.

Thus, to solve the described problem, adjustments are further made. The main spacer 11 and the sensor spacer 15 in FIG. 1B are formed in different processes, respectively. In FIG. 1B, the sensor spacer 15 and the conductive layer 19 are formed, and the main spacer 11 is then formed, such that the surface of the main spacer 11 is free of any conductive layer. When a user presses the touch panel 101, even if the main spacer 11 in the non-pressed region deviates from the tolerance range A of the stack structure 13 by the physical force, the contact of the main spacer 11 (its surface is free of the conductive layer) with the nearby pixel electrode 17B will not produce unexpected bright points due to shorting. Therefore, it mitigates the bright points or low aspect ratio problems in FIG. 1A. However, the two processes for forming two spacers produce larger film thickness variation, which increase the cell gap variation between the top and bottom substrates. The main and sensor spacers 11 and 15 formed by the single lithography process in FIG. 1A have a height error value of ±0.15 µm. The main and sensor spacers 11 and 15 formed by the two lithography processes in FIG. 1B have a height error value of ±0.3 µm. Accordingly, sensor gap variations between the conductive layer 19 on the sensor spacer 15 and the contact pad 17 is largely increased by greater height error values, such that different display regions of the touch panel 101 have different touch sensitivities.

Accordingly, a solution is called for the conductive layer on the main spacer problem come from the single lithography of forming the mains spacer and the sensor spacer.

BRIEF SUMMARY OF THE DISCLOSURE

The disclosure provides a method for manufacturing a touch panel, comprising providing a substrate; forming a photospacer layer on the substrate; performing a single lithography process to the photospacer layer for defining a main spacer and a sensor spacer; forming a conductive layer on the main spacer and the sensor spacer; and removing a part of the conductive layer to expose a top part and a part of the upper side of the main spacer.

The disclosure also provides a touch panel, comprising a substrate; a main spacer and a sensor spacer on the substrate; and a conductive covering the sensor substrate, wherein the conductive layer only covers a part of the lower side of the main spacer, and does not cover a top part and a part of the upper side of the main spacer.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

Figure 1A:
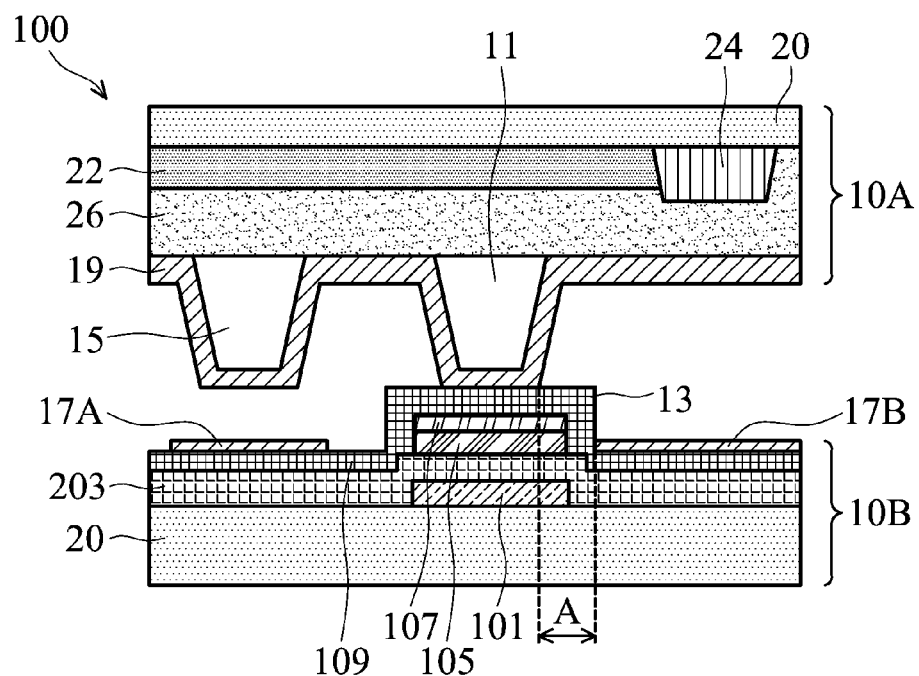
FIGS. 1A and 1B are cross sections of conventional touch panels.
Figure 1B:
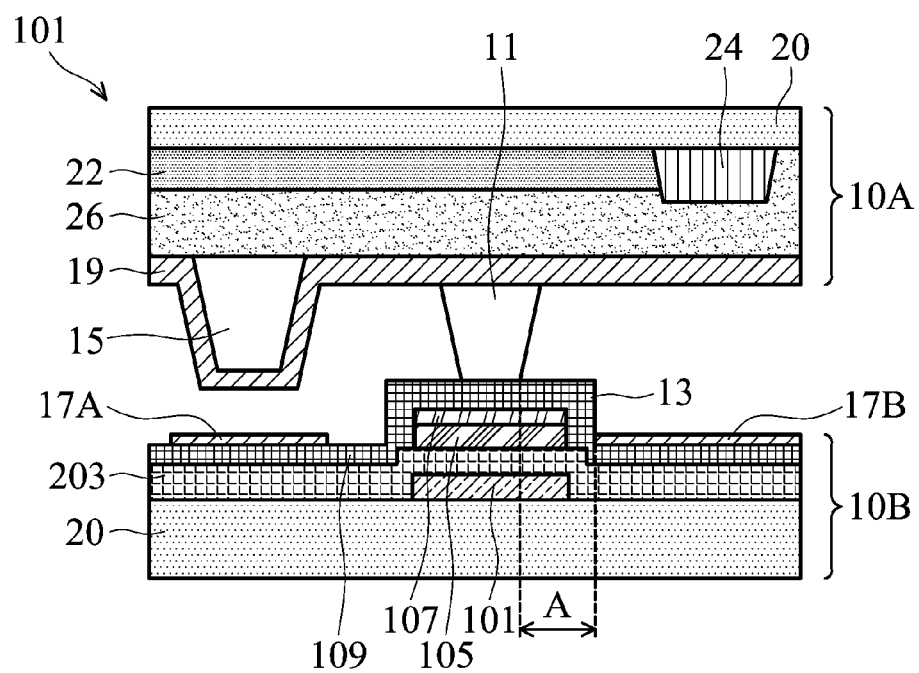

The following description is of the best-contemplated mode of carrying out the disclosure. This description is made for the purpose of illustrating the general principles of the disclosure and should not be taken in a limiting sense. The scope of the disclosure is best determined by reference to the appended claims.

It is understood, that the following disclosure provides many different embodiments, or examples, for implementing different features of the disclosure. Specific examples of components and arrangements are described below to simplify the present disclosure. These are, of course, merely examples and are not intended to be limiting. For example, descriptions of a first layer or feature "on" or "overlying" (as well as similar descriptions) a second layer or feature. These terms include embodiments where the first and second layers are in direct contact and those where one or more layers or feature are interposing the first and second layer. In addition, the present disclosure may repeat reference numerals and/or letters in the various examples. This repetition is for the purpose of simplicity and brevity and does not in itself dictate a relationship between the various embodiments and/or configurations discussed.

Figure 2A:
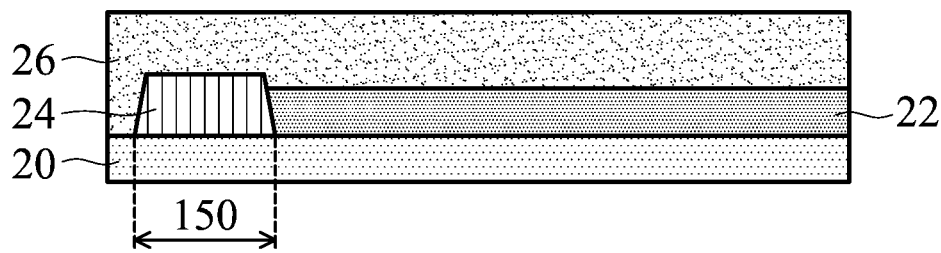
FIGS. 2A-2J are cross sections showing the serial processes to form the main spacer and the sensor spacer on the substrate in one embodiment of the disclosure.

For solving the described conventional problems, the disclosure provides a method for manufacturing a touch panel as shown in FIGS. 2A-2J. In FIG. 2A, a substrate 20 is provided, a black matrix 22 is formed on the substrate 20, and a part of the black matrix 22 is removed to expose a part of the substrate 20 to define a pixel region 150, wherein the pixel region 150 is surrounded by the black matrix 22. As such, the pixel region 150 is disposed in or between the black matrix 22. A color resin (not shown) is then filled into the pixel region 150 in the black matrix 22 to form a color filter 24. Thereafter, an overcoat layer 26 is formed on the black matrix 22 and the color filter 24. The substrate 20 can be transparent material such as glass, quartz, or other transparent materials, opaque material such as ceramic, wafer, or other opaque materials, or flexible material such as plastic, rubber, polyester, polycarbonate, or other flexible materials. The black matrix 22 includes photosensitive material or photo-insensitive material. Photosensitive material includes a liquid photoresist dissolved in solvent, a liquid resin, a dry film photoresist, or a transfer film photoresist. For example, the photosensitive material can be acrylic resin, epoxy resin, or polyimide resin, wherein the resins have photosensitive functional groups. The photosensitive material may be mixed with dye, pigment, or carbon black to reduce transparency of the photosensitive material. The photo-insensitive material may be acrylic resin, epoxy resin, or polyimide resin. Similar to the photosensitive material, the photo-insensitive material may be mixed with dye, pigment, or carbon black. Photo-insensitive material does not need functional groups, thereby reducing material costs. Alternatively, photo-insensitive material can be metal material such as chromium, chromium oxide, molybdenum, aluminum, titanium, other suitable materials, or combinations thereof. If the photosensitive material is selected to be black matrix 22, the patterning step thereof can be a conventional lithography process. If the photo-insensitive material is selected to be black matrix, the patterning is formed by laser ablation or accompanied with another conventional lithography process. The overcoat layer 26 includes resin or plastic, and it can be formed by a spin-on process. The overcoat 26 is used to protect the black matrix 22 and the color filter 24 from damage during subsequent processes.

Figure 2B:
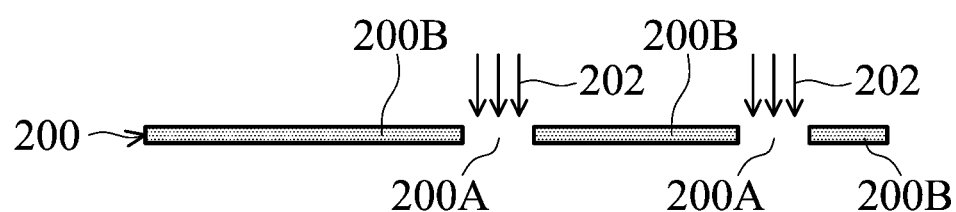
Figure 2B:
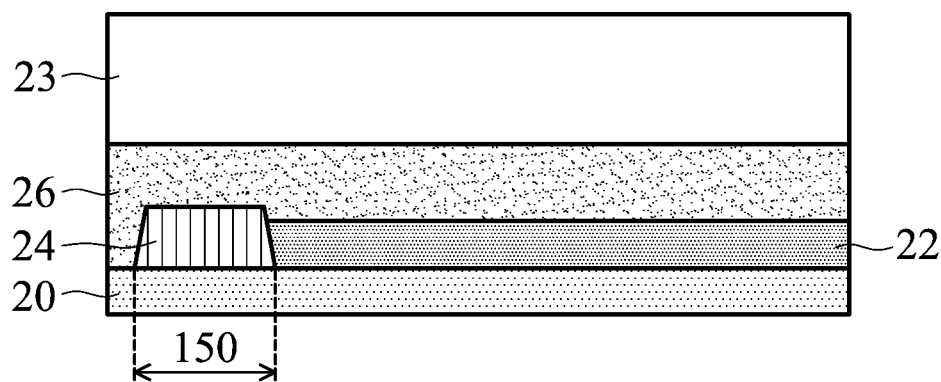
Figure 2C:
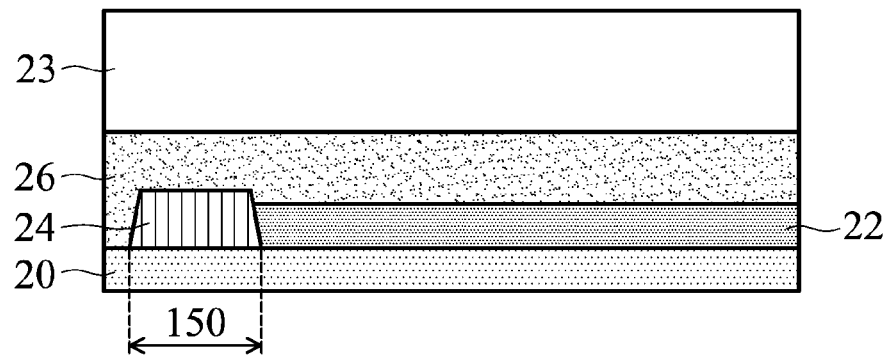
Figure 2D:
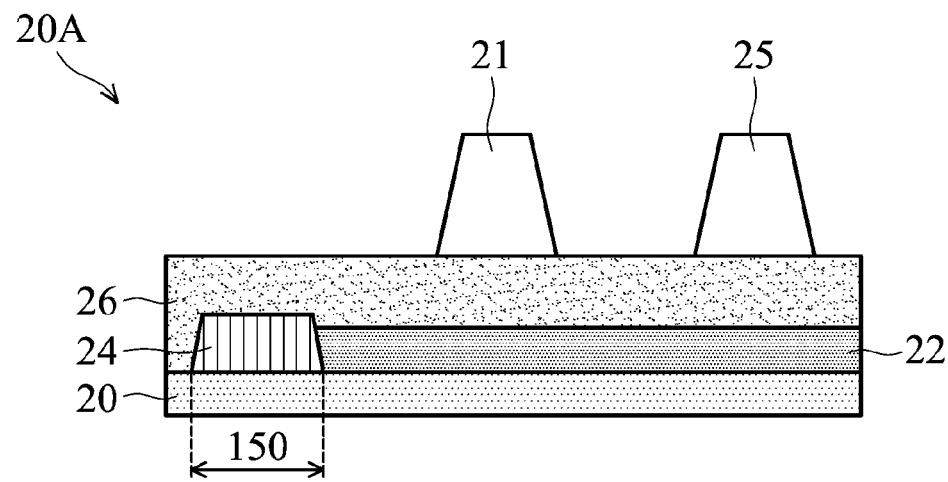

As shown in FIG. 2B or 2C, a photoresist layer 23 is then formed on the overcoat layer 26, and a single photo mask 200 is used to simultaneously define a main spacer 21 and a sensor spacer 25 in FIG. 2D through exposure and development processes. If the photoresist layer 23 is a negative type as shown in FIG. 2B, the photoresist layer 23 corresponding to the transparent region 200A of the photo mask 200 will define the main spacer 21 and the sensor spacer 25, and the photoresist layer 23 corresponding to the opaque region 200B of the photo mask 200 will be removed. If the photoresist layer 23 is a positive type as shown in FIG. 2C, the photoresist layer 23 corresponding to the opaque region 200B of the photo mask 200 will define the main spacer 21 and the sensor spacer 25, and the photoresist layer 23 corresponding to the transparent region 200A of the photo mask 200 will be removed. In other embodiments, a digital laser exposure process using different laser densities and/or process periods controlled by digital signals can be applied to the photoresist layer 23 to form the spacers 21 and 25. Alternatively, the photoresist can be jet-printed by an ink-jet head on the overcoat layer 26 to form the spacers 21 and 25.

Figure 2E:
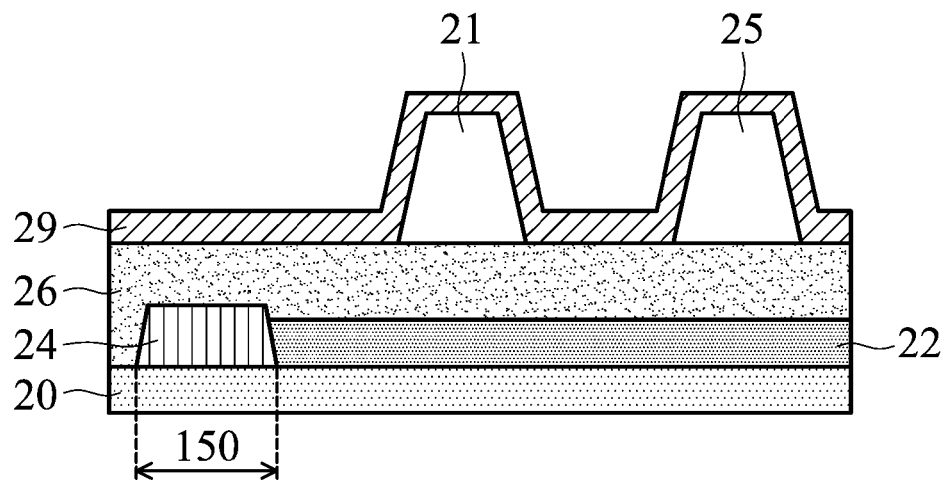

As shown in FIG. 2E, a conductive layer 29 is then formed on the main spacer 21 and the sensor spacer 25. Specifically, the conductive layer 29 is conformally formed on the spacer surface and the overcoat layer 26 surface. Although the design of the main spacer 21 is incomplete, most of the color filter substrate 10A in FIG. 2J is finished. The conductive layer 29 includes indium ton oxide (ITO), indium zinc oxide (IZO), aluminum zinc oxide (AZO), or composites thereof. The formation of the conductive layer 29 can be by chemical vapor deposition (CVD), sputtering, evaporation, screen-printing process, or the likes.

Figure 2F:
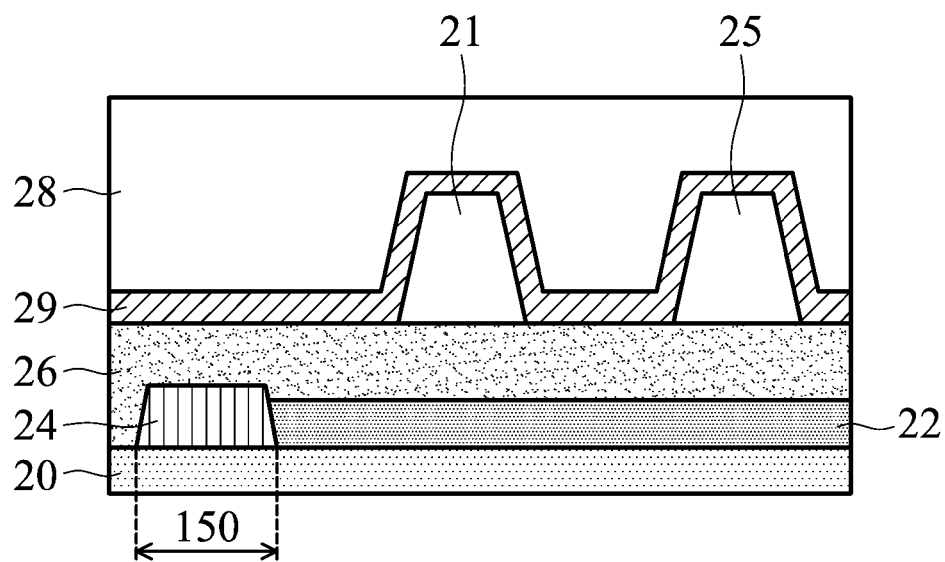

As shown in FIG. 2F, a photoresist layer 28 is then formed on the conductive layer 29. In one embodiment, the photoresist layer 29 is a thick film photoresist, and its thickness is thicker than the height of the main spacer 21 and the sensor spacer 25. The thick film photoresist has a viscosity of about 3000 to 5000 centistokes (cSt), such as a commercially available 125nXT-10 series from AX. The viscosity of the thick film photoresist is greater than a normal photoresist (with a viscosity far less than 3000 cSt).

Figure 2G:
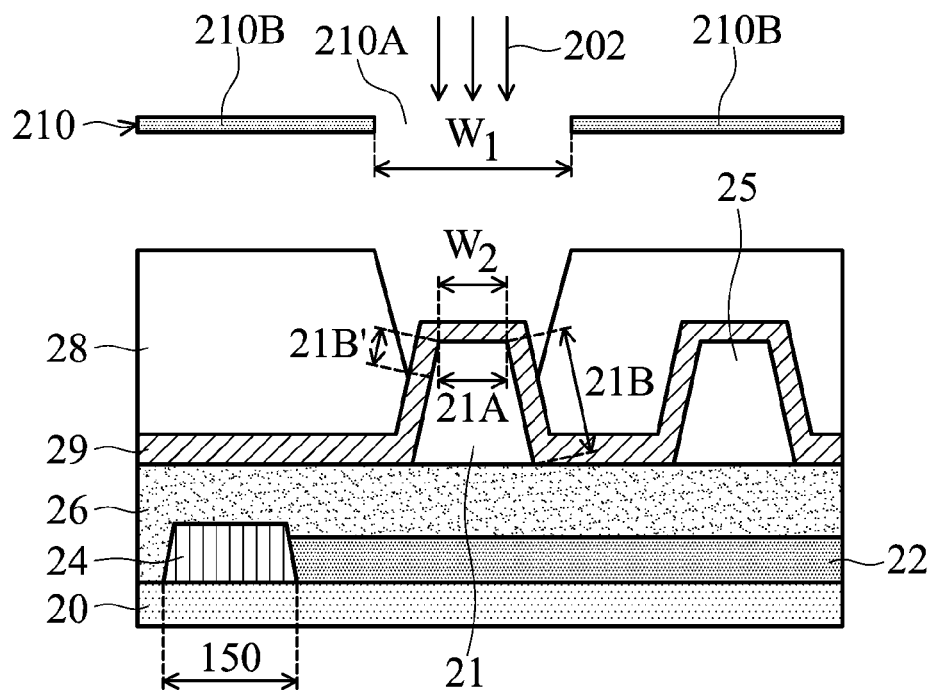

As shown in FIG. 2G, a photo mask 210 is applied for exposure and development processes 202, thereby removing a part of the photoresist layer 28 to expose the conductive layer 29 on a top part 21A and a part of the upper side 21B' of the side 21B of the main spacer 21. The photo mask 210 has a transparent region 210A and an opaque region 210B. The transparent region 210A corresponds to the main spacer 21, and the opening width $W_1$ thereof is greater than the width $W_2$ of the top part 21A of the main spacer 21. The opaque region 210B corresponds to the region other than the top part 21A of the main spacer 21. In FIG. 2G, the photoresist layer 28 is a positive type and the design of the photo mask 210 corresponds to the positive photoresist layer. It is understood that the photoresist layer 28 can be a negative type with a corresponding photo mask, is not limited to the positive type. In another embodiment, the design of the opening width of the photo mask and corresponding regions is not limited to the described design.

Figure 2H:
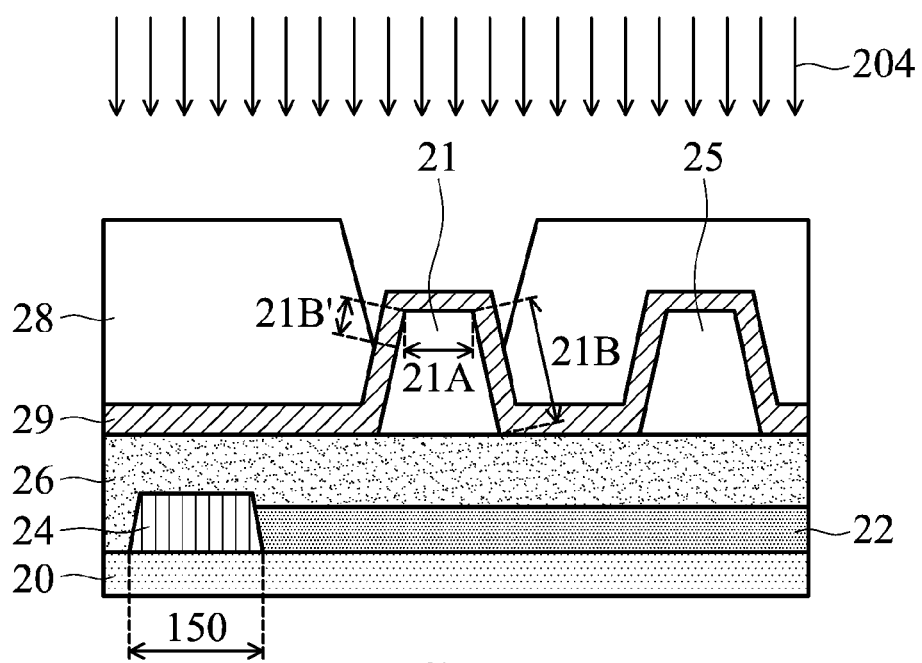
Figure 2I:
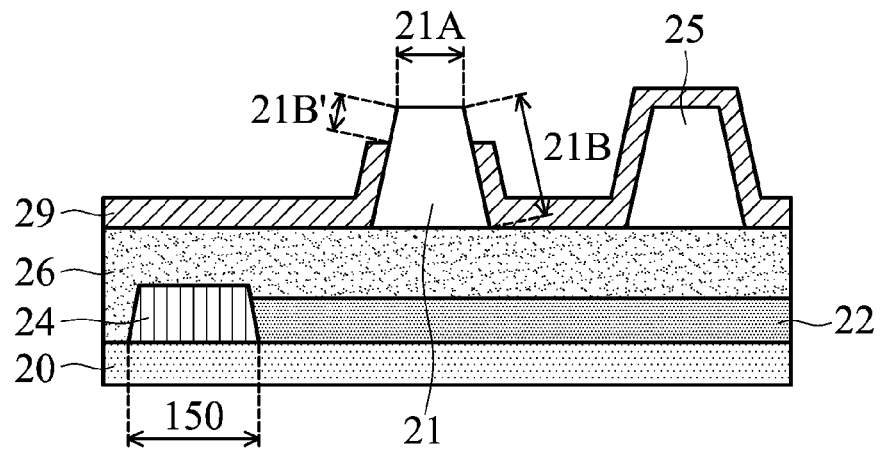
Figure 2J:
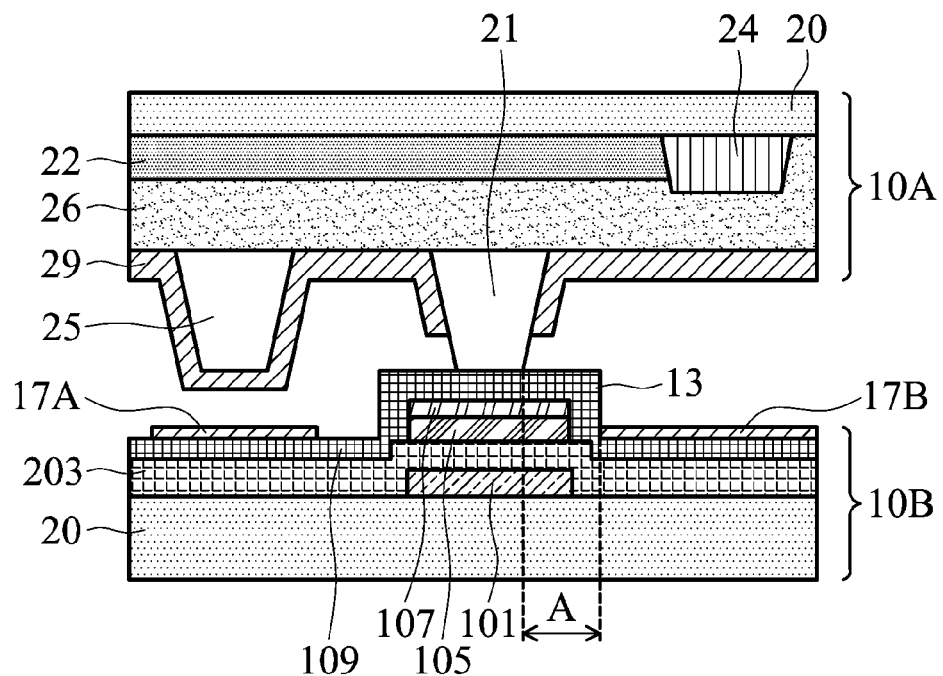

As shown in FIG. 2H, the exposed part of the conductive layer 29 is removed by an etching process 204, thereby exposing the top part 21A and the part of the upper side 21B' of the side 21B of the main spacer 21. The exposed part of the upper side 21B' and the total side 21B have a ratio of 10:100 to 90:100 (21B'/21B=10%~90%), preferably 60:100 to 80:100 (21B'/21B=60%~80%). The etching process 204 includes dry etching and/or wet etching. After the etching process 204, the photoresist layer 28 is removed to form the structure as shown in FIG. 2I. The removal of the photoresist layer 28 can be by a stripping or ashing process.

As shown in FIG. 2J, the color filter substrate 10A in FIG. 2I is combined with the array substrate 10B in FIG. 1A. After filling the display medium layer (not shown) such as liquid crystal or electrophoretic material into the cell between the substrates, a so-called in-cell touch panel is completed. Specifically, the processes for forming the touch panel and the display panel are simultaneously finished, other than a touch panel adhered to the outer surface of any substrate in the display panel. Theoretically, the conductive layer 29 on the top part 21A of the main spacer 21 may solve the conventional problems. If the conductive layer is only removed from the top part 21A of the main spacer 21, however, the incomplete removal of the conductive layer 29 on the top part 21A will be extremely possible due to process errors such as misalignment. It is proven by the experiment that the process tolerance is efficiently improved by expending the removal of the conductive layer 29 to part of the upper side 21B' of the side 21B of the main spacer 21. As such, the conductive layer 20 on the top part 21A of the main spacer 21A being completely removed can be confirmed.

In addition, the disclosure does not totally remove all conductive layer 29 on the side 21B of the main spacer 21, thereby avoiding to reduce the aspect ratio of the touch panel due to over removing the conductive layer 29 on the color filter 24 of the color filter region 150 caused from process errors such as misalignment. Because the removal boundary of the conductive layer 29 is still located on the side 21B of the main spacer 21, the disclosure may simultaneously efficiently increase the process tolerance and not reduce the aspect ratio of the touch panel.

Figure 3A:
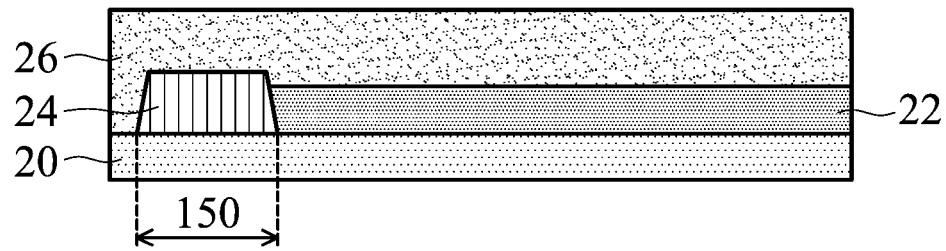
FIGS. 3A-3J are cross sections showing the serial processes to form the main spacer and the sensor spacer on the substrate in one embodiment of the disclosure.
Figure 3B:
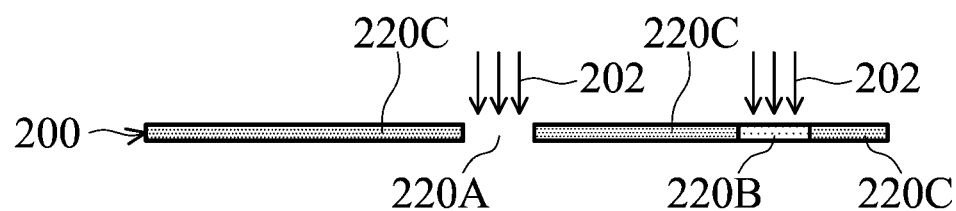
Figure 3B:
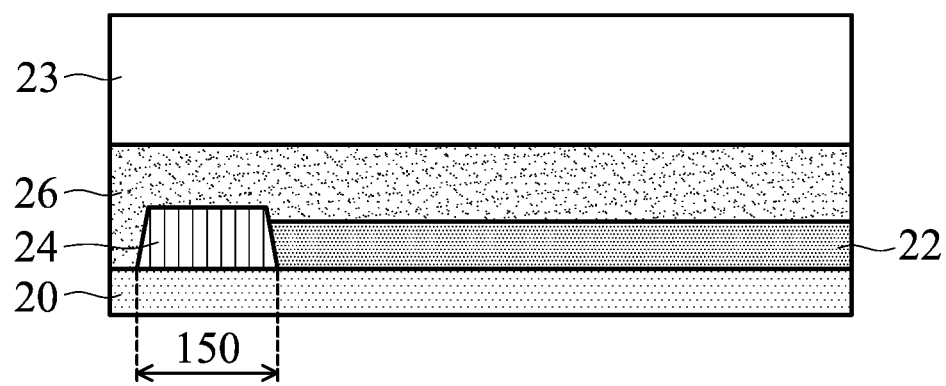
Figure 3C:
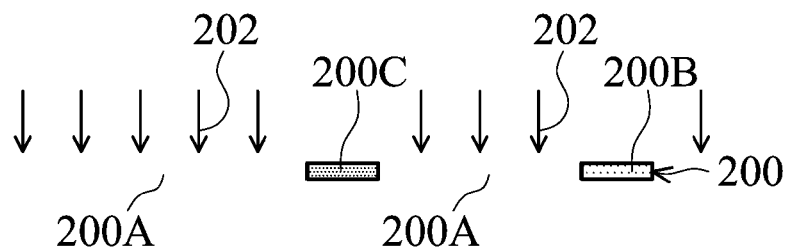
Figure 3C:
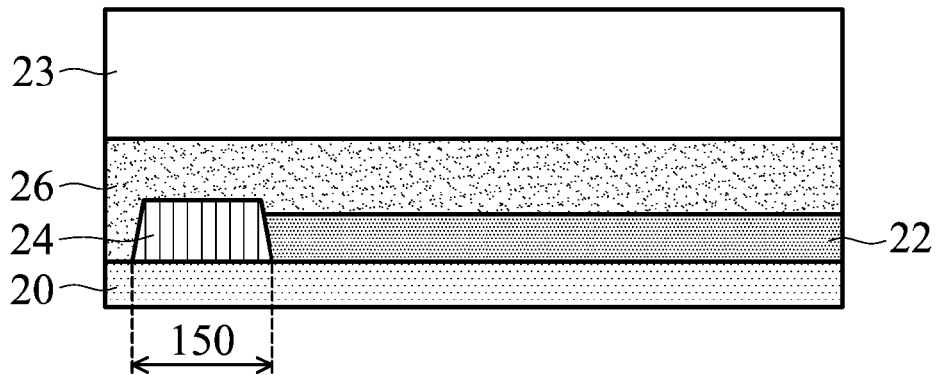
Figure 3D:
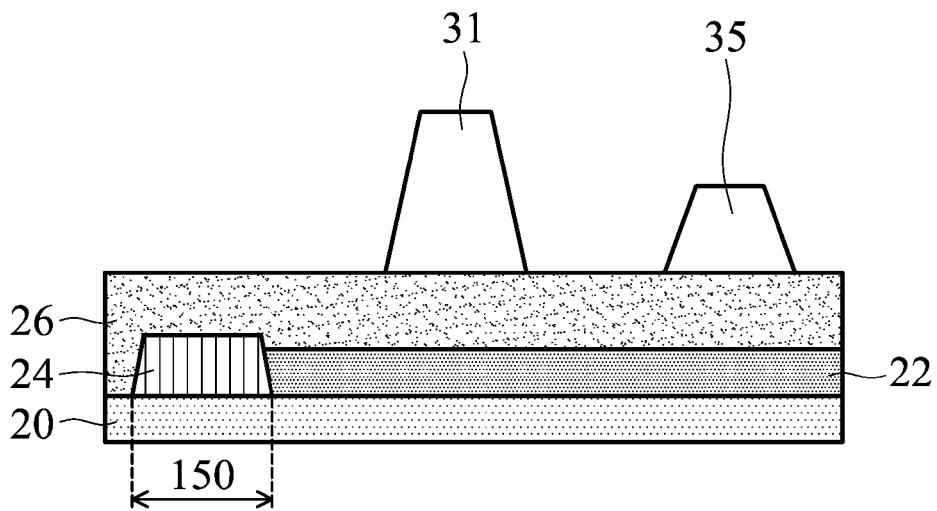

The disclosure also provides an embodiment as shown in FIGS. 3A to 3J. In FIG. 3A, material selection and formation of the substrate 20, the black matrix 22, the color filter 24, and the overcoat layer 26 are similar to that of FIG. 2A. As shown in FIG. 3B or 3C, a photoresist layer 23 is then formed on the overcoat layer 26, and processed exposure and development processes 202 by a single halftone photo mask 220 to simultaneously define a main spacer 31 and a sensor spacer 35 in FIG. 3D. If the photoresist layer 23 is a negative type as shown in FIG. 3B, the photoresist layer 23 corresponding to the transparent region 220A of the halftone photo mask 220 will define the main spacer 31, the photoresist layer 23 corresponding to the semi-transparent region 220B of the halftone photo mask 220 will define the sensor spacer 35, and the photoresist layer 23 corresponding to the opaque region 220B of the halftone photo mask 220 will be removed. The height ratio between the main spacer 31 and the sensor spacer 35 is determined by the transparency degree of the semi-transparent region 220B. The sensor spacer 35 is higher in height when the semi-transparent region 220B has greater transparency degree. If the photoresist layer 23 is a positive type as shown in FIG. 3C, the halftone photo mask 220 will adopt an opposite design: the photoresist layer 23 corresponding to the opaque region 220C of the halftone photo mask 220 will define the main spacer 31, the photoresist layer 23 corresponding to the semi-transparent region 220B of the halftone photo mask 220 will define the sensor spacer 35, and the photoresist layer 23 corresponding to the transparent region 220A of the halftone photo mask 220 will be removed. The sensor spacer 35 is lower in height when the semi-transparent region 220B has greater transparency degree. After the exposure and development step 202, the main spacer 31 and the sensor spacer 35 of different heights are formed as shown in FIG. 3D. If this design is utilized to form a color filter substrate, its opposite array substrate may optionally have a stacked structure (not shown) and/or a contact pad (not shown) constituted of a multi-film stack or single film. In other embodiments, a digital laser exposure process using different laser densities and/or process periods controlled by digital signals can be applied to the photoresist layer 23 to form the spacers 31 and 35 with different heights. Alternatively, the photoresist can be jet-printed by an ink-jet head on the overcoat layer 26 to form the spacers 31 and 35 with different heights.

Figure 3E:
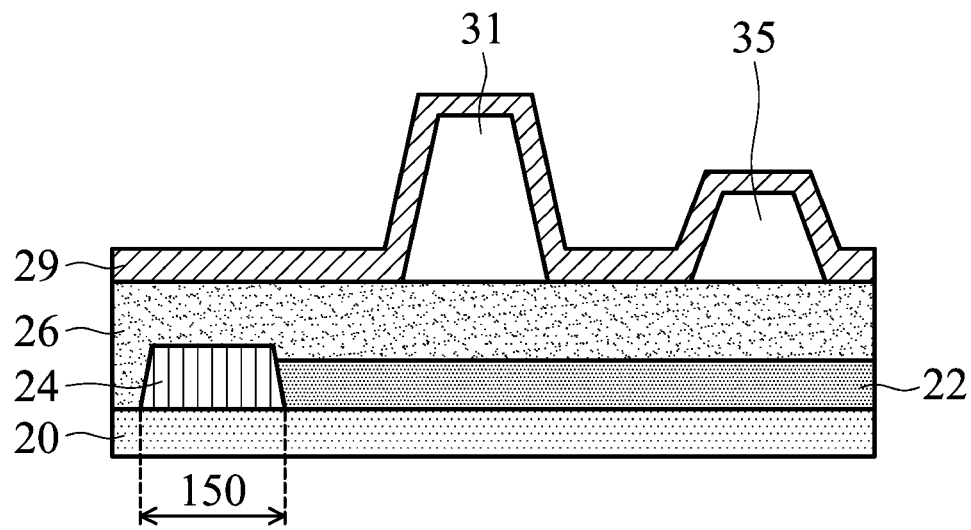

As shown in FIG. 3E, a conductive layer 29 is then formed on the main spacer 31 and the sensor spacer 35. Specifically, the conductive layer 29 is conformally formed on the spacer surface and the overcoat layer 26 surface. Material selection and formation of the conductive layer 29 is described above and omitted here for brevity.

Figure 3F:
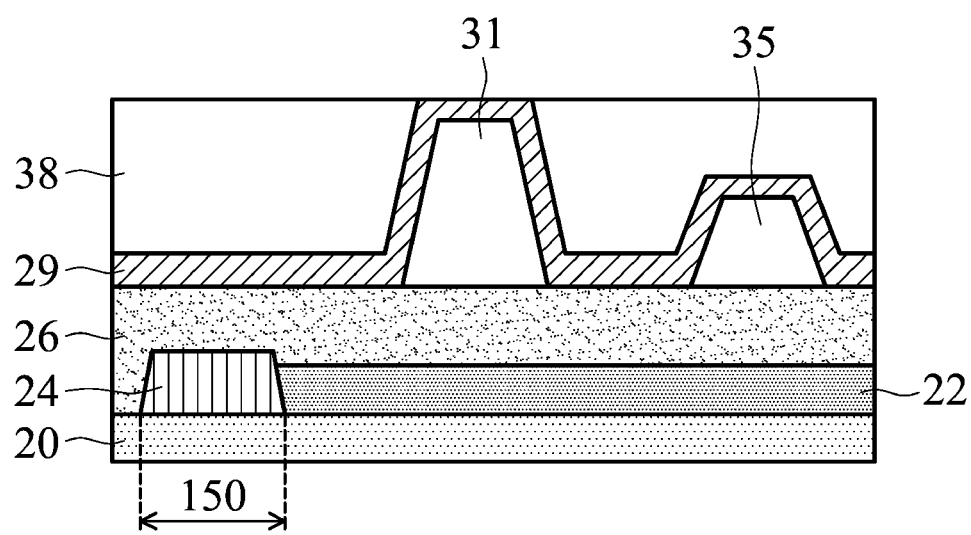

As shown in FIG. 3F, a photoresist layer 38 is then formed to cover the conductive layer 29 on the main spacer 31 and the sensor spacer 35. Because of the height difference between the spacers, the photoresist layer 38 has sufficient thickness to cover the sensor spacer 35 but not necessarily totally cover the main spacer 31. In FIG. 3F, a top surface of the photoresist layer 38 and the conductive layer 29 on a top part of the main spacer 31 have the same height level.

Figure 3G:
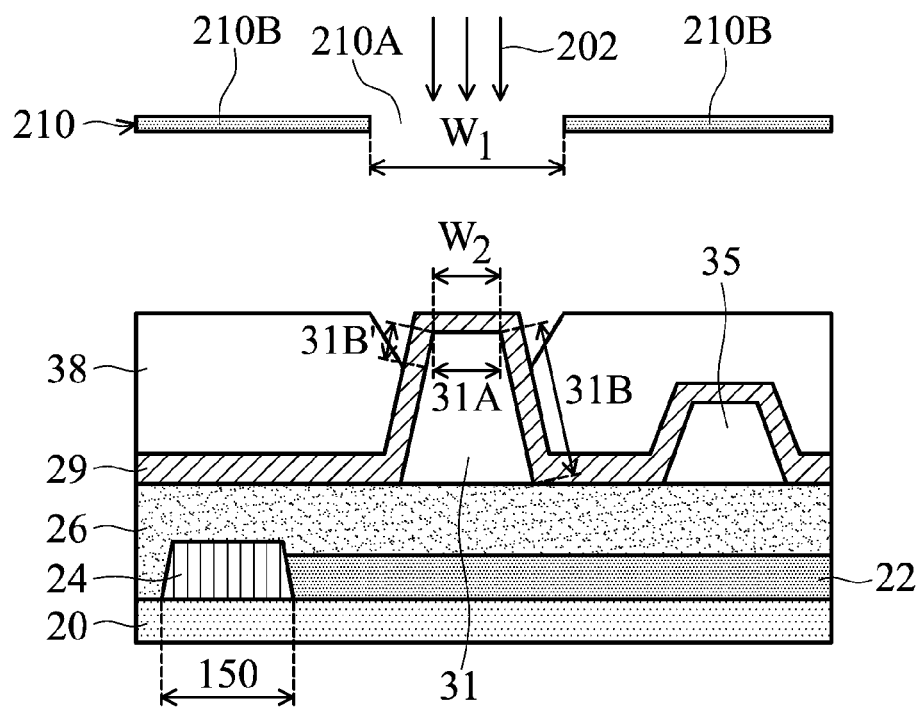

As shown in FIG. 3G, a photo mask 210 is applied for exposure and development processes 202, thereby removing a part of the photoresist layer 38 to expose the conductive layer 29 on a top part 31A and a part of the upper side 31B' of the side 31B of the main spacer 31. The photo mask 210 has a transparent region 210A and an opaque region 210B. The transparent region 210A corresponds to the main spacer 31, and the opening width $W_1$ thereof is greater than the width $W_2$ of the top part 31A of the main spacer 31. The opaque region 210B corresponds to the region other than the top part 31A of the main spacer 31. In FIG. 3G, the photoresist layer 38 is a positive type and the design of the photo mask 210 corresponds to the positive photoresist layer. It is understood that the photoresist layer 38 can be a negative type with a corresponding photo mask, and is not limited to being a positive type. In another embodiment, the design of the opening width of the photo mask and corresponding regions is not limited to the described design.

Figure 3H:
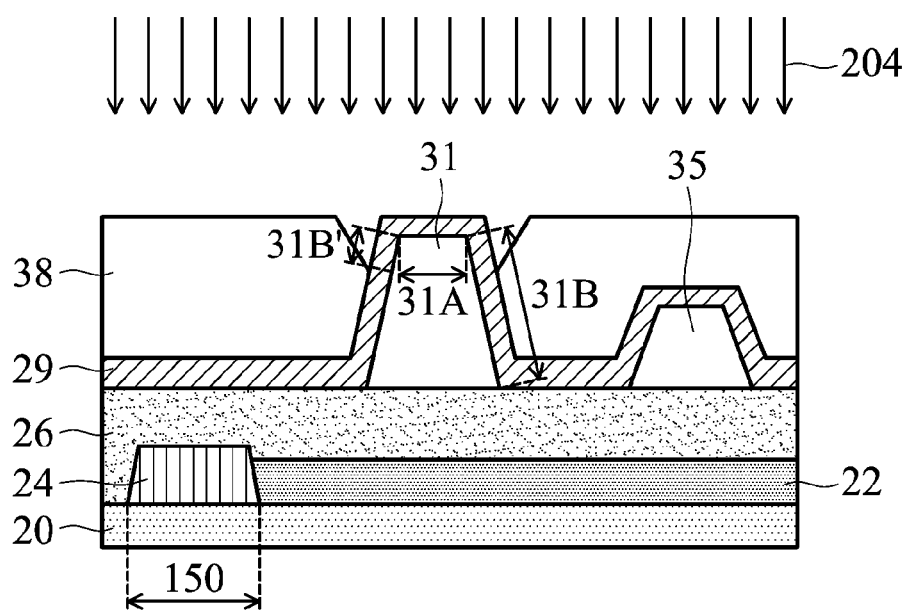

As shown in FIG. 3H, the exposed part of the conductive layer 29 is removed by an etching process 204, thereby exposing the top part 31A and a part of the upper side 31B' of the side 31B of the main spacer 31. The exposed part of the upper side 31B' and the total side 31B have a ratio of 10:100 to 90:100 (31B'/31B=10%~90%), preferably 60:100 to 80:100 (31B'/31B=60%~80%). The etching process 204 includes dry etching and/or wet etching.

In another embodiment, the photoresist layer 38 only covers the conductive layer 29 on the sensor spacer 35 and exposes the conductive layer 29 on the top part 31A and a part of the upper side 31B' of the side 31B of the main spacer 31. The etching process 204, shown in FIG. 3H, can remove the exposed part of the conductive layer 29 to expose the top part 31A and the part of the upper side 31B' of the side 31B of the main spacer 31, wherein the exposure and development processes 202 in FIG. 3G is eliminated. The etching process 204 is similar to that in FIG. 2H and omitted here for brevity.

Figure 3I:
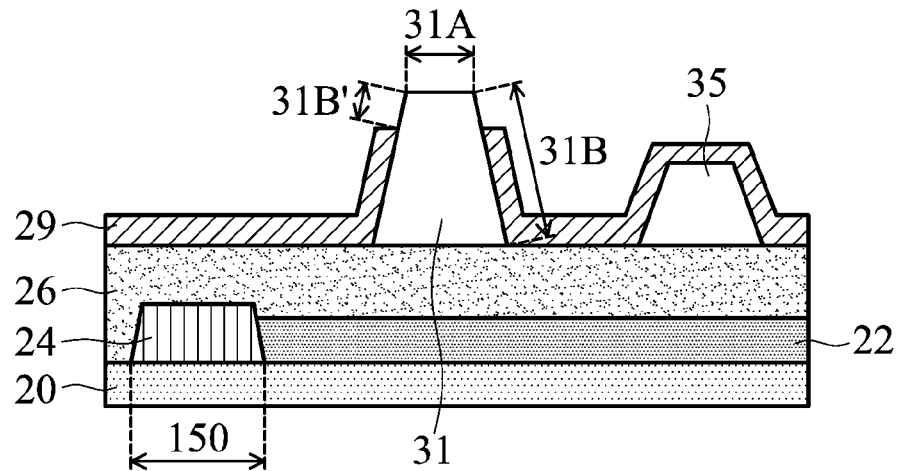

As shown in FIG. 3I, the photoresist layer 38 is removed. The removal of the photoresist layer 38 can be by stripping or ashing process. Similar to the structure in FIG. 2I, the exposed part of the upper side 31B' and the total side 31B have a ratio of 10:100 to 90:100, preferably 60:100 to 80:100.

Figure 3J:
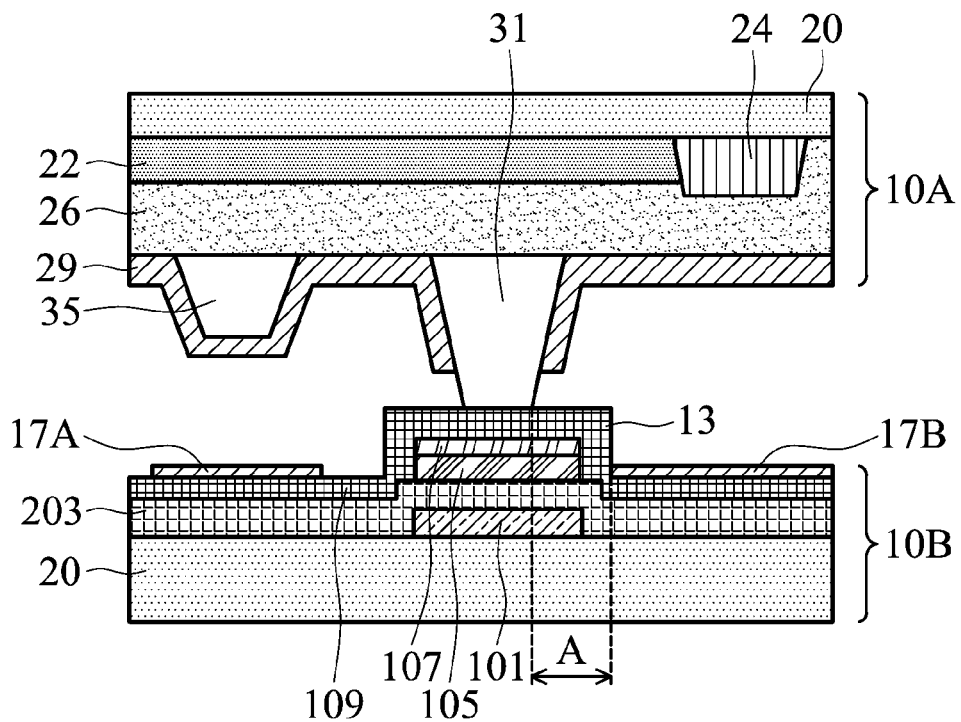

As shown in FIG. 3J, the color filter substrate 10A in FIG. 3I is combined with the array substrate 10B. After filling the display medium layer (not shown) such as liquid crystal or electrophoretic material into the cell between the substrates, a so-called in-cell touch panel is completed. Specifically, the processes for forming the touch panel and the display panel are simultaneously finished, other than a touch panel adhered to the outer surface of any substrate in the display panel. As described above, the removal of the conductive layer 29 on the top part 31A and the part of the upper side 31B' of the side 31B of the main spacer 31, the conductive layer 29 on the top part 31A is completely removed. In addition, the remaining part of the conductive layer 29 on the lower part of the side 31B of the main spacer 31 is used to avoid reducing the aspect ratio due to over removing the conductive layer 29 on the color filter 24.

Figure 4A:
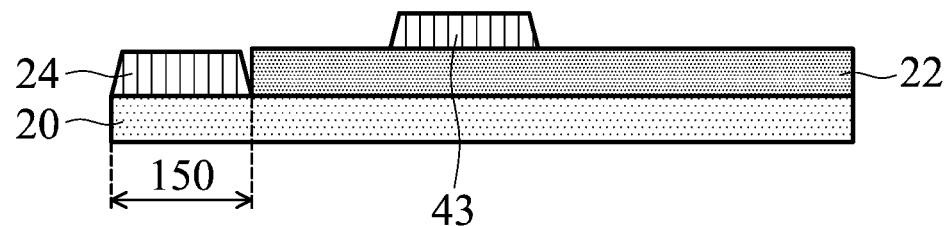
FIGS. 4A-4K are cross sections showing the serial processes to form the main spacer and the sensor spacer on the substrate in one embodiment of the disclosure.

The disclosure also provides an embodiment as shown in FIGS. 4A to 4K. In FIG. 4A, material selection and formation of the substrate 20, the black matrix 22, and the color filter 24 are similar to that of FIG. 2A. The difference between FIGS. 2A and 4A is a bedding layer 43 formed on the black matrix in FIG. 4A. In one embodiment, the bedding layer 43 can be insulation layer, metal layer, color filter, or combinations thereof. The bedding layer 43 and the color filter 24 can be simultaneously formed if they are composed of same material. The formation of the bedding layer 43 can be before or after the formation of the color filter 24 if they are composed of different materials.

Figure 4B:
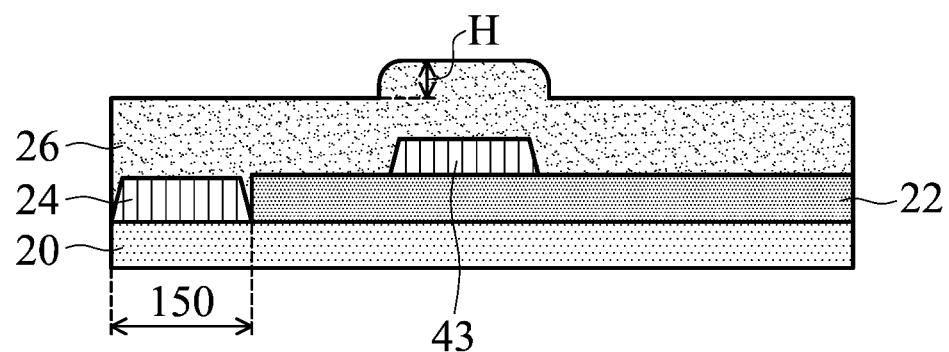

As shown in FIG. 4B, an overcoat layer 26 is then formed on the black matrix 22, the color filter 24, and the bedding layer 33, wherein the overcoat layer 26 corresponding to the bedding layer 43 will protrude a height H.

Figure 4C:
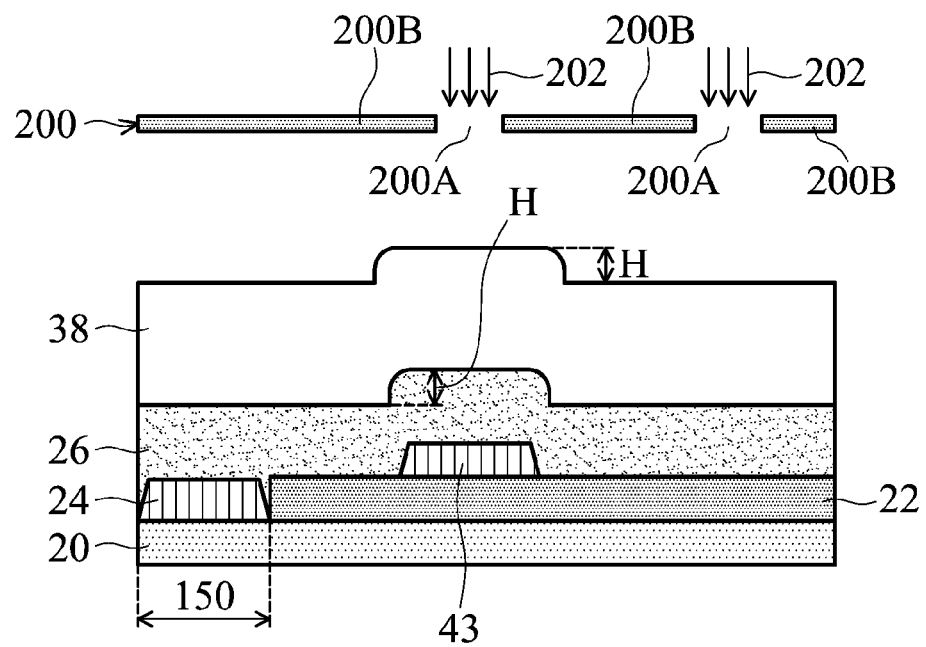
Figure 4D:
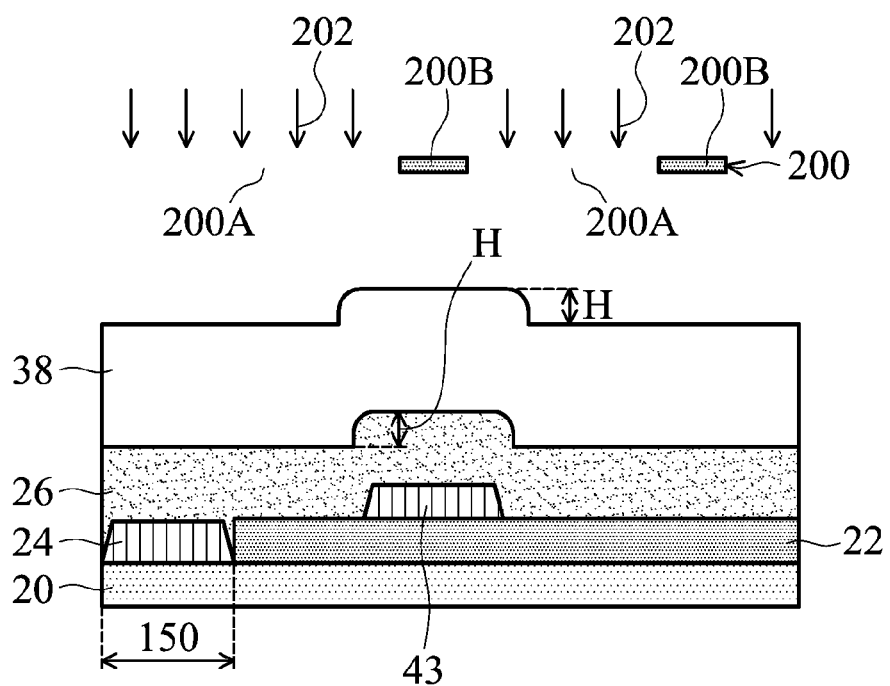
Figure 4E:
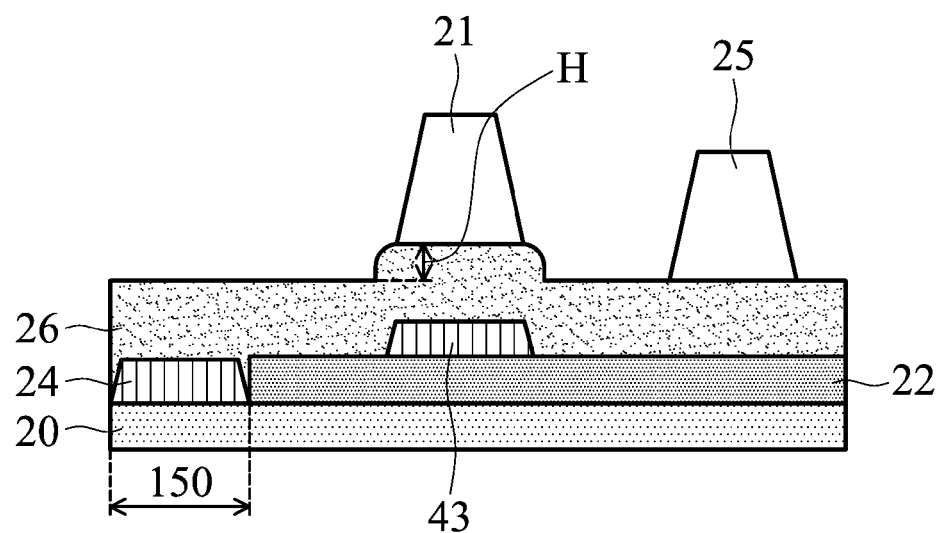

As shown in FIG. 4C or 4D, a photoresist layer 23 is then formed on the overcoat layer 26, and a single photo mask 200 is used to simultaneously define a main spacer 21 and a sensor spacer 25 in FIG. 4E by exposure and development processes 202. As shown in FIGS. 4C and 4D, the photoresist layer 23 corresponding to the bedding layer 43 protrudes the height H, and a top part of the main spacer 21 and a top part of the sensor spacer 25 also have a height difference of H. If the photoresist layer 23 is a negative type as shown in FIG. 4C, the photoresist layer 23 corresponding to the transparent region 200A of the photo mask 200 will define the main spacer 21 and the sensor spacer 25, and the photoresist layer 23 corresponding to the opaque region 200B of the photo mask 200 will be removed. If the photoresist layer 23 is a positive type as shown in FIG. 4D, the photoresist layer 23 corresponding to the opaque region 200B of the photo mask 200 will define the main spacer 21 and the sensor spacer 25, and the photoresist layer 23 corresponding to the transparent region 200A of the photo mask 200 will be removed. If this design is utilized to form a color filter substrate, its opposite array substrate may optionally have a stacked structure (not shown) and/or a contact pad (not shown) constituted of a multi-film stack or single film. In other embodiments, a digital laser exposure process using different laser densities and/or process periods controlled by digital signals can be applied to the photoresist layer 23 to form the spacers 21 and 25. Alternatively, the photoresist can be jet-printed by an ink-jet head on the overcoat layer 26 to form the spacers 21 and 25.

Figure 4F:
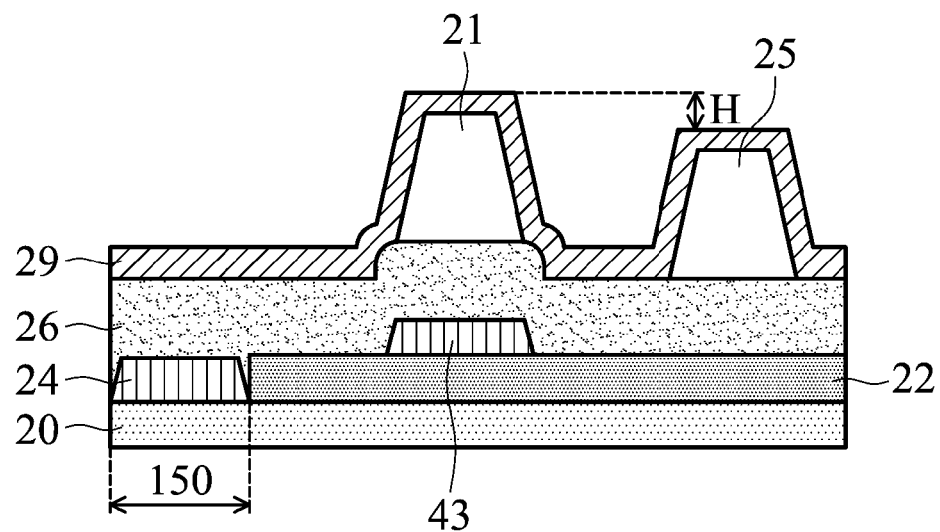

As shown in FIG. 4F, a conductive layer 29 is then formed on the overcoat layer 26, the main spacer 21, and the sensor spacer 25. Specifically, the conductive layer 29 is conformally formed on the spacer surface and the overcoat layer 26 surface. Material selection and formation of the conductive layer 29 is described above and omitted here for brevity.

Figure 4G:
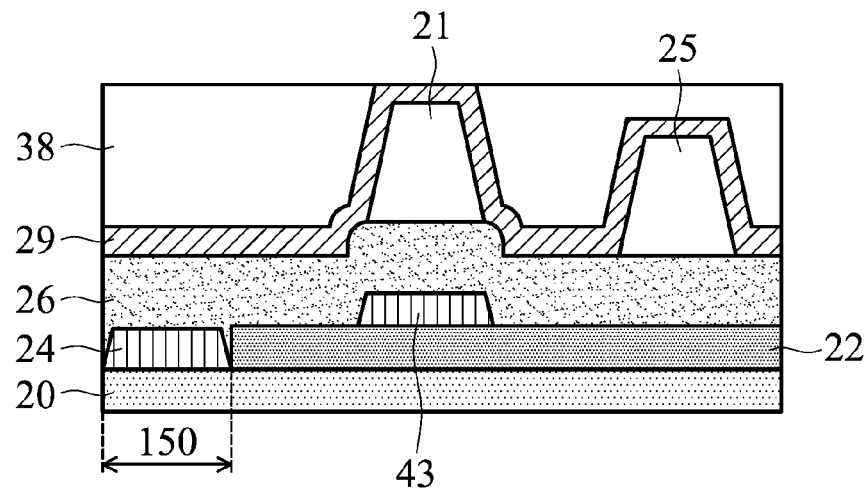

As shown in FIG. 4G, a photoresist layer 38 is then formed to cover the conductive layer 29 on the main spacer 21 and the sensor spacer 25. Because of the bedding layer 43 under the main spacer 21, the top part of the main spacer 21 and the top part of the sensor spacer 25 have different height of H. As such, the photoresist layer 38 has sufficient thickness to cover the sensor spacer 25 but not necessarily totally cover the main spacer 21. In FIG. 4G, a top surface of the photoresist layer 38 and the conductive layer 29 on the top part of the main spacer 21 have the same height level.

Figure 4H:
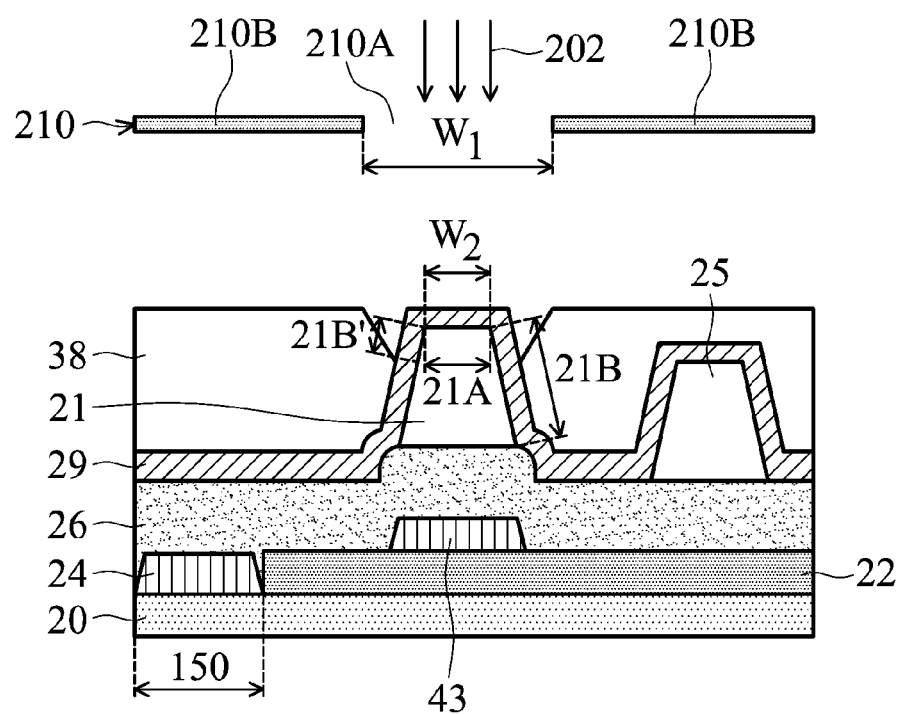

As shown in FIG. 4H, a photo mask 210 is applied exposure and development processes 202, thereby removing a part of the photoresist layer 38 to expose the conductive layer 29 on the a top part 21A and a part of the upper side 21B' of the side 21B of the main spacer 21. The photo mask 210 has a transparent region 210A and an opaque region 210B. The transparent region 210A corresponds to the main spacer 21, and the opening width $W_1$ thereof is greater than the width $W_2$ of the top part 21A of the main spacer 21. The opaque region 210B corresponds to the region other than the top part 21A of the main spacer 21. In FIG. 4H, the photoresist layer 38 is a positive type and the design of the photo mask 210 corresponds to the positive photoresist layer. It is understood that the photoresist layer 38 can be a negative type with a corresponding photo mask, is not limited to the positive type. In another embodiment, the design of the opening width of the photo mask and corresponding regions is not limited to the described design.

Figure 4I:
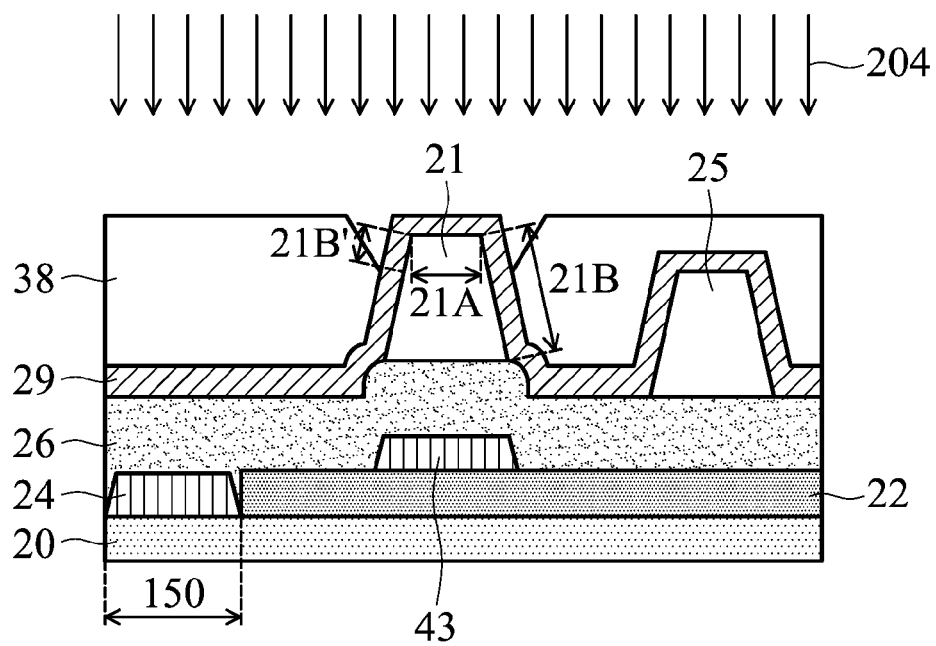

As shown in FIG. 4I, the exposed part of the conductive layer 29 is removed by an etching process 204, thereby exposing the top part 21A and the part of the upper side 21B' of the side 21B of the main spacer 21. The exposed part of the upper side 21B' and the total side 21B have a ratio of 10:100 to 90:100 (21B'/21B=10%~90%), preferably 60:100 to 80:100 (21B'/21B=60%~80%). The etching process 204 includes dry etching and/or wet etching.

In another embodiment, the photoresist layer 38 only covers the conductive layer 29 on the sensor spacer 25 and exposes the conductive layer 29 on the top part 21A and the part of the upper side 21B' of the side 21B of the main spacer 21. The etching process 204 in FIG. 4I can remove the exposed part of the conductive layer 29 to expose the top part 21A and the part of the upper side 21B' of the side 21B of the main spacer 21, and the exposure and development step 202 in FIG. 4H can be eliminated. The etching process 204 is similar to that in FIG. 2H and omitted here for brevity.

Figure 4J:
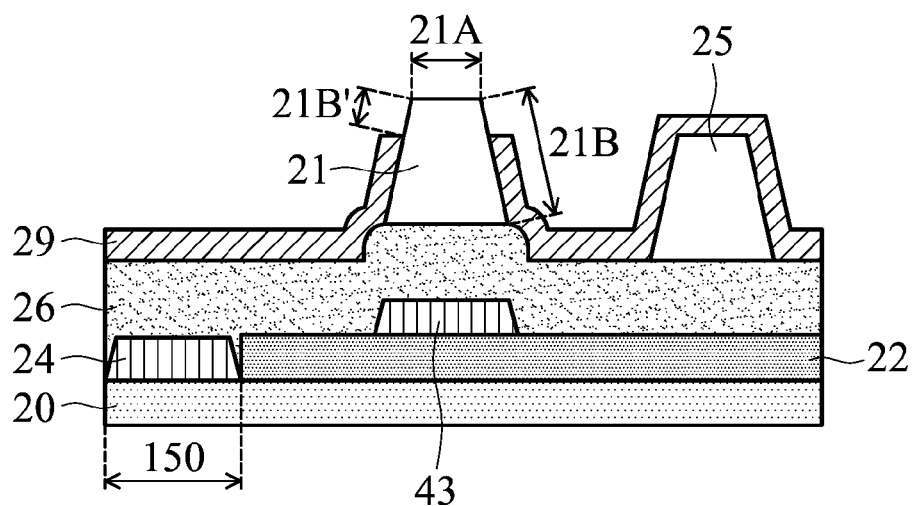

As shown in FIG. 4J, the photoresist layer 38 is removed. The removal of the photoresist layer 38 can be by stripping or ashing process. Similar to the structure in FIG. 2I, the exposed part of the upper side 21B' and the total side 21B have a ratio of 10:100 to 90:100, preferably 60:100 to 80:100.

Figure 4K:
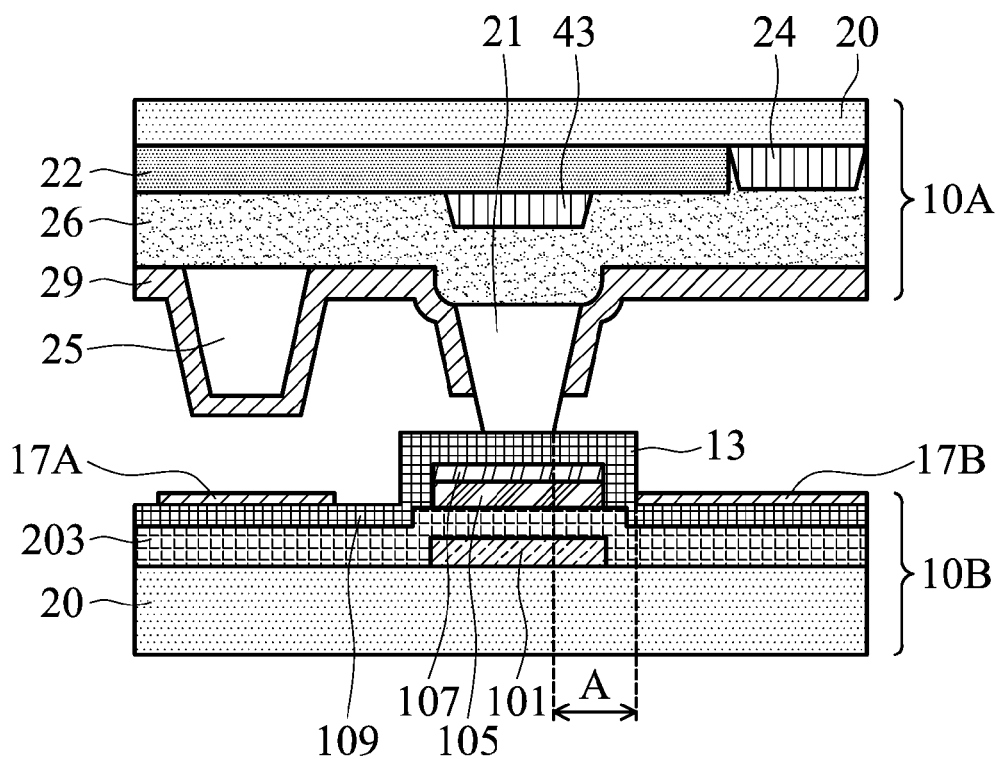

As shown in FIG. 4K, the color filter substrate 10A in FIG. 4J is combined with the array substrate 10B. After filling the display medium layer (not shown) such as liquid crystal or electrophoretic material into the cell between the substrates, a so-called in-cell touch panel is completed. Specifically, the processes for forming the touch panel and the display panel are simultaneously finished, other than a touch panel adhered to the outer surface of any substrate in the display panel. As described above, the removal of the conductive layer 29 on the top part 21A and the part of the upper side 21B' of the side 21B of the main spacer 21 may completely remove the conductive layer 29 on the top part 21A. In addition, the remaining part of the conductive layer 29 on the lower part of the side 21B of the main spacer 21 are used to avoid reducing aspect ratio due to over removing the conductive layer 29 on the color filter 24.

Figure 5A:
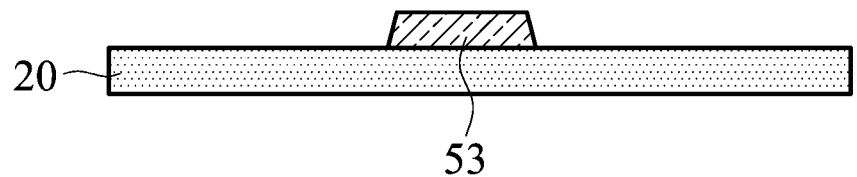
FIGS. 5A-5M are cross sections showing the serial processes to form the main spacer and the sensor spacer on the substrate in one embodiment of the disclosure.

The disclosure further provides an embodiment as shown in FIGS. 5A to 5M. In FIG. 5A, a conductive line 53 is firstly formed on a substrate 20. The conductive line 53 may serve as a shielding electrode, and its material includes Ti, Ta, Ag, Au, Pt, Cu, Al, Mo, Nd, W, Cr, Rh, Re, Ru, Co, other suitable metals, the alloys thereof, or multi-layered structures thereof. The conductive line 53 also includes transparent electrode such as ITO, IZO, AZO, or composites thereof. The conductive line 53 can be formed by CVD, sputtering, evaporation, screen-printing process, or the likes.

Figure 5B:
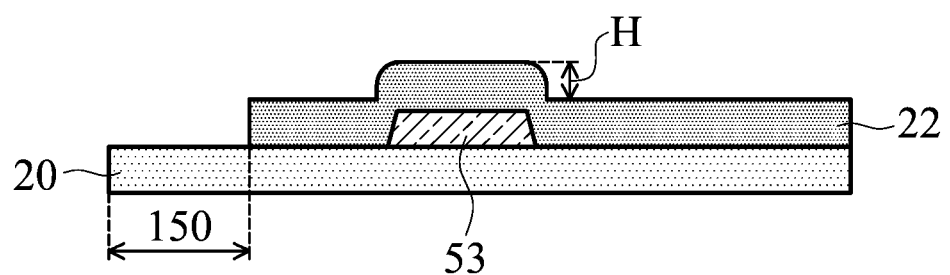
Figure 5C:
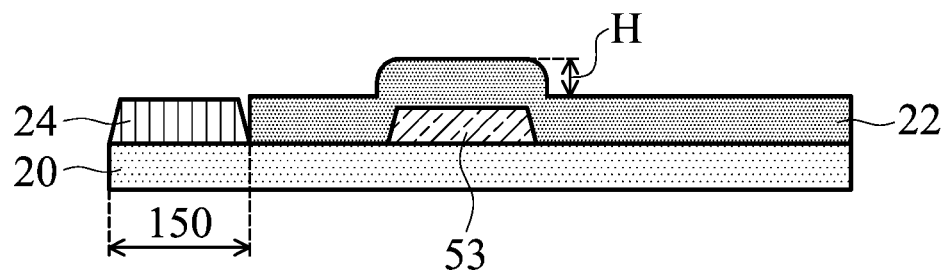

As shown in FIG. 5B, a black matrix 22 is then formed on the substrate 20, and a part of the black matrix 22 is removed to expose a part of the substrate 20 to define a pixel region 150, wherein the pixel region 150 is surrounded by the black matrix 22. As such, the pixel region 150 is disposed in or between the black matrix 22. To prevent influencing the electrical connection of the conductive line 53, the metal cannot be selected as the black matrix 22. As shown in FIG. 5B, the black matrix 22 corresponding to the conductive line 53 protrudes a height H. As shown in FIG. 5C, a color resin (not shown) is filled into the pixel region 150 in the black matrix 22 to form a color filter 24.

Figure 5D:
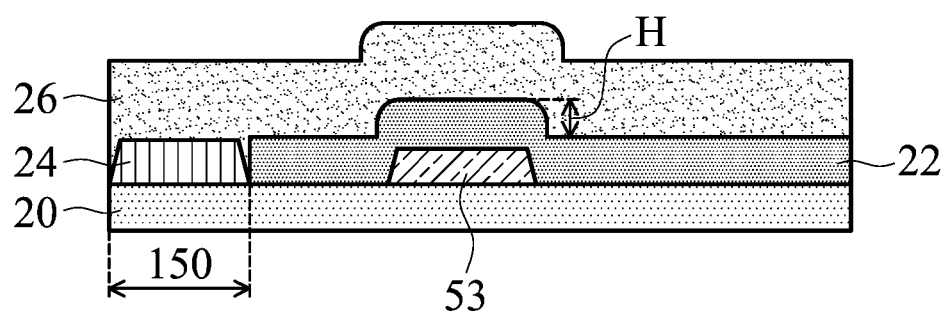

As shown in FIG. 5D, a overcoat layer 26 is then formed on the black matrix 22 and the color filter 24, wherein the overcoat layer 26 corresponding to the conductive line 53 protrudes a height H.

Figure 5E:
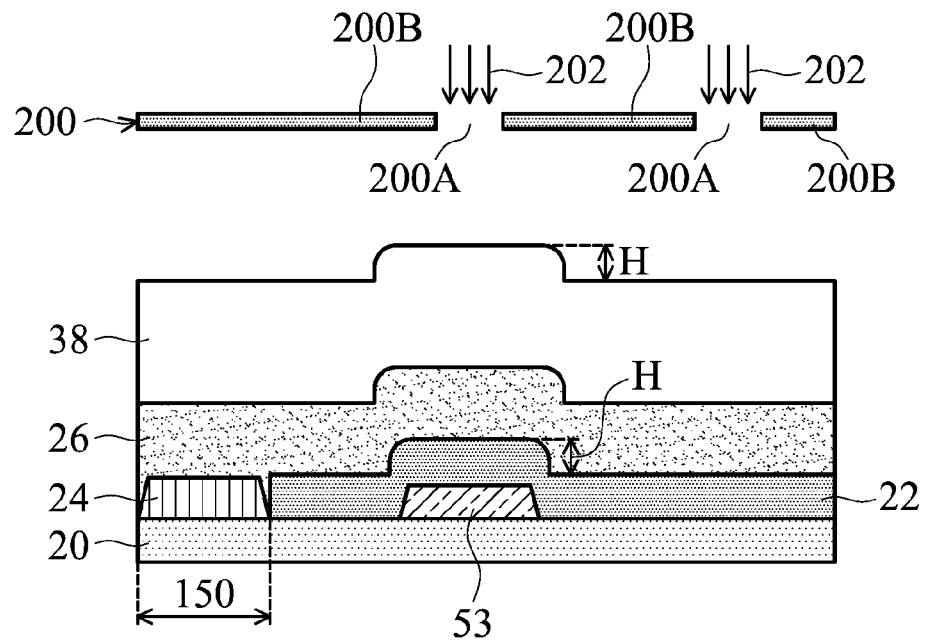
Figure 5F:
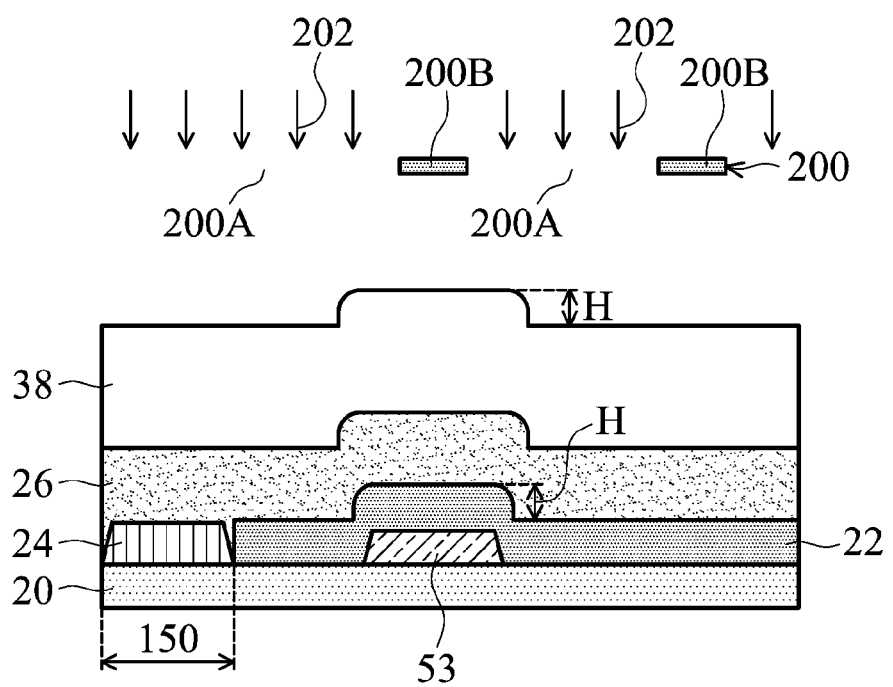
Figure 5G:
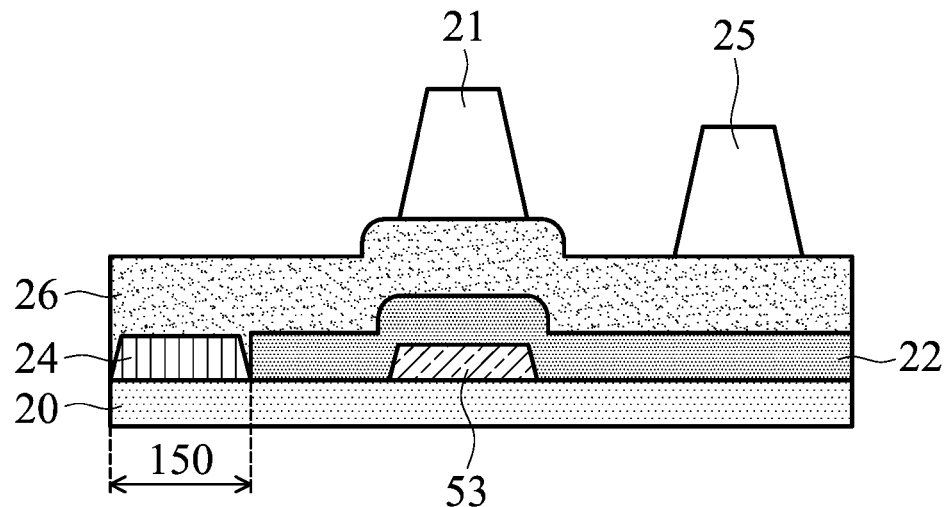

As shown in FIG. 5E or 5F, a photoresist layer 23 is then formed on the overcoat layer 26, and a single photo mask 200 is used to simultaneously define a main spacer 21 and a sensor spacer 25 in FIG. 5G by exposure and development processes 202. As shown in FIGS. 5E and 5F, the photoresist layer 23 corresponding to the conductive line 53 protrudes a height H, and a top part of the main spacer 21 and a top part of the sensor spacer 25 in FIG. 5G also have a height difference of H. If the photoresist layer 23 is a negative type as shown in FIG. 5E, the photoresist layer 23 corresponding to the transparent region 200A of the photo mask 200 will define the main spacer 21 and the sensor spacer 25, and the photoresist layer 23 corresponding to the opaque region 200B of the photo mask 200 will be removed. If the photoresist layer 23 is a positive type as shown in FIG. 5F, the photoresist layer 23 corresponding to the opaque region 200B of the photo mask 200 will define the main spacer 21 and the sensor spacer 25, and the photoresist layer 23 corresponding to the transparent region 200A of the photo mask 200 will be removed. If this design is utilized to form a color filter substrate, its opposite array substrate may optionally have a stacked structure (not shown) and/or a contact pad (not shown) constituted of a multi-film stack or single film. In other embodiments, a digital laser exposure process using different laser densities and/or process periods controlled by digital signals can be applied to the photoresist layer 23 to form the spacers 21 and 25. Alternatively, the photoresist can be jet-printed by an ink-jet head on the overcoat layer 26 to form the spacers 21 and 25.

As described above, the conductive layer 53 and the bedding layer 43 in FIGS. 4A-4J have similar effects. In one embodiment, the conductive layer 53 under the black matrix 22 and the bedding layer 43 on the black matrix 22 can be simultaneously adopted to tune the height difference between the top part of the main spacer 21 and the top part of the sensor spacer 25. Note that the conductive line 53 in FIG. 5G can be replaced with the bedding layer 43 to tune the height difference between the top parts of the two spacers.

Figure 5H:
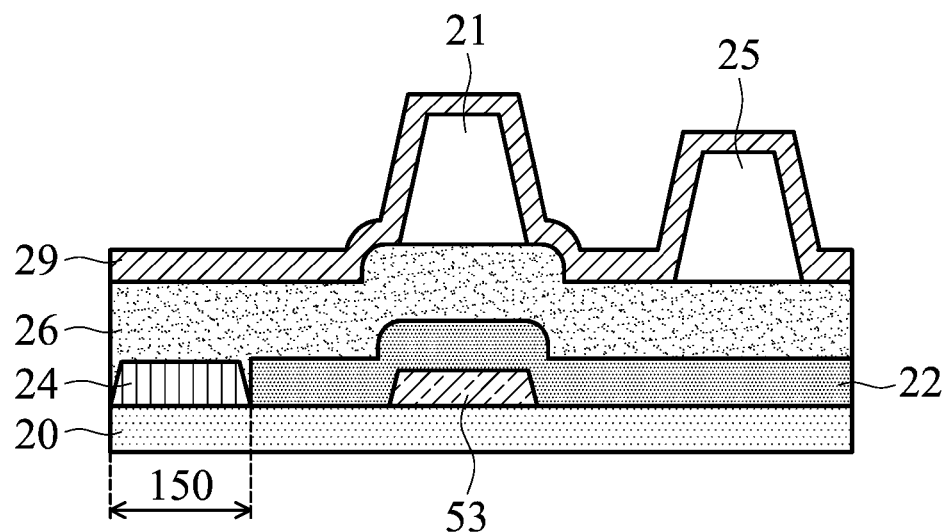

As shown in FIG. 5H, a conductive layer 29 is then formed on the overcoat layer 26, the main spacer 21, and the sensor spacer 25. Specifically, the conductive layer 29 is conformally formed on the spacer surface and the overcoat layer 26 surface. Material selection and formation of the conductive layer 29 is described above and omitted here for brevity.

Figure 5I:
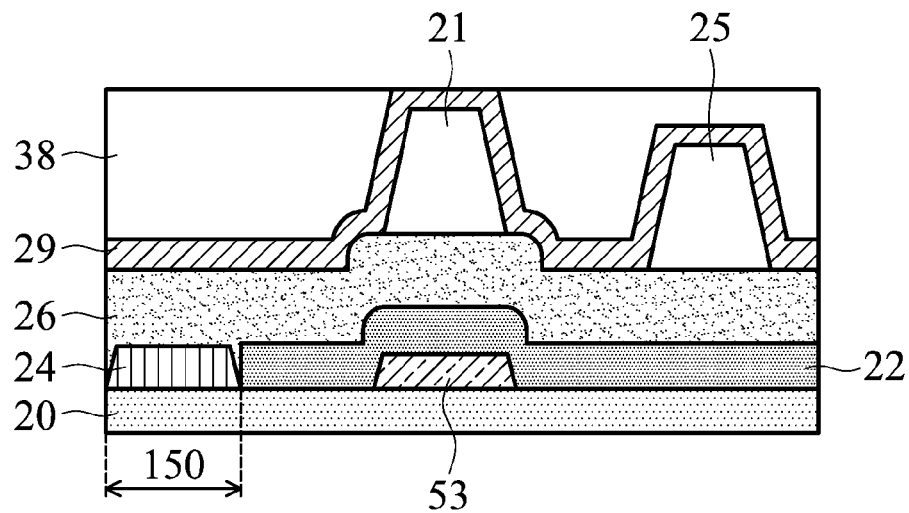

As shown in FIG. 5I, a photoresist layer 38 is then formed to cover the conductive layer 29 on the main spacer 21 and the sensor spacer 25. Because the conductive line 53 is under the main spacer 21, the photoresist layer 38 has sufficient thickness to cover the sensor spacer 25 but not necessarily totally cover the main spacer 21. In FIG. 5I, a top surface of the photoresist layer 38 and the conductive layer 29 on the top part of the main spacer 21 have the same height level.

Figure 5J:
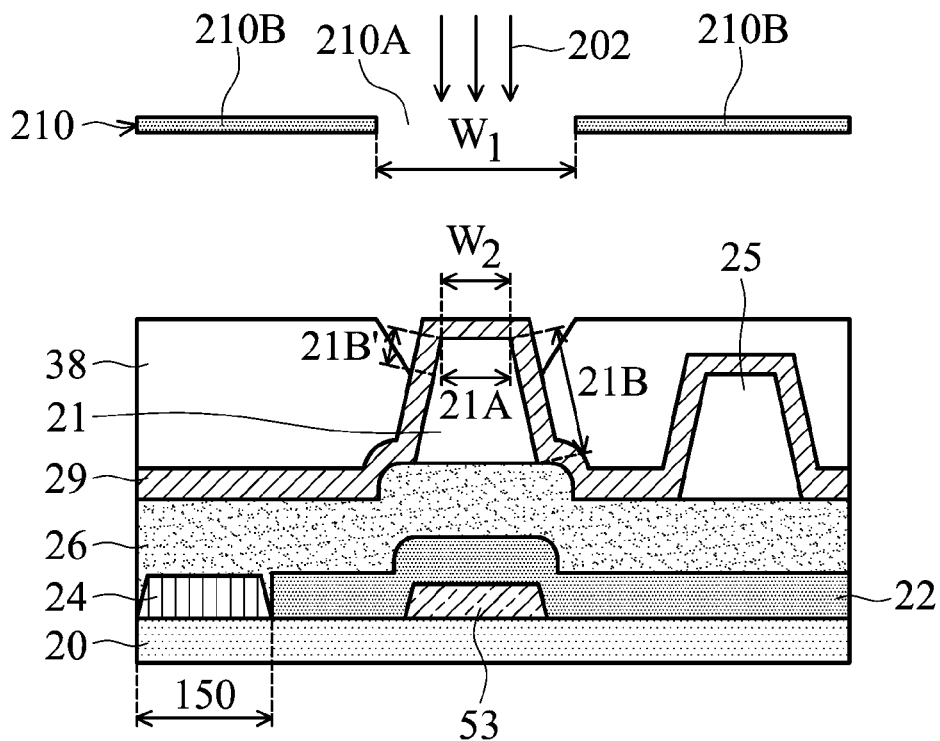

As shown in FIG. 5J, a photo mask 210 is applied to process exposure and development processes 202, thereby removing a part of the photoresist layer 38 to expose the conductive layer 29 on the top part 21A and the part of the upper side 21B' of the side 21B of the main spacer 21. The photo mask 210 has a transparent region 210A and an opaque region 210B. The transparent region 210A corresponds to the main spacer 21, and the opening width $W_1$ thereof is greater than the width $W_2$ of the top part 21A of the main spacer 21. The opaque region 210B corresponds to the region other than the top part 21A of the main spacer 21. In FIG. 5J, the photoresist layer 38 is a positive type and the design of the photo mask 210 corresponds to the positive photoresist layer. It is understood that the photoresist layer 38 can be a negative type with a corresponding photo mask, is not limited to the positive type. In another embodiment, the design of the opening width of the photo mask and corresponding regions is not limited to the described design.

Figure 5K:
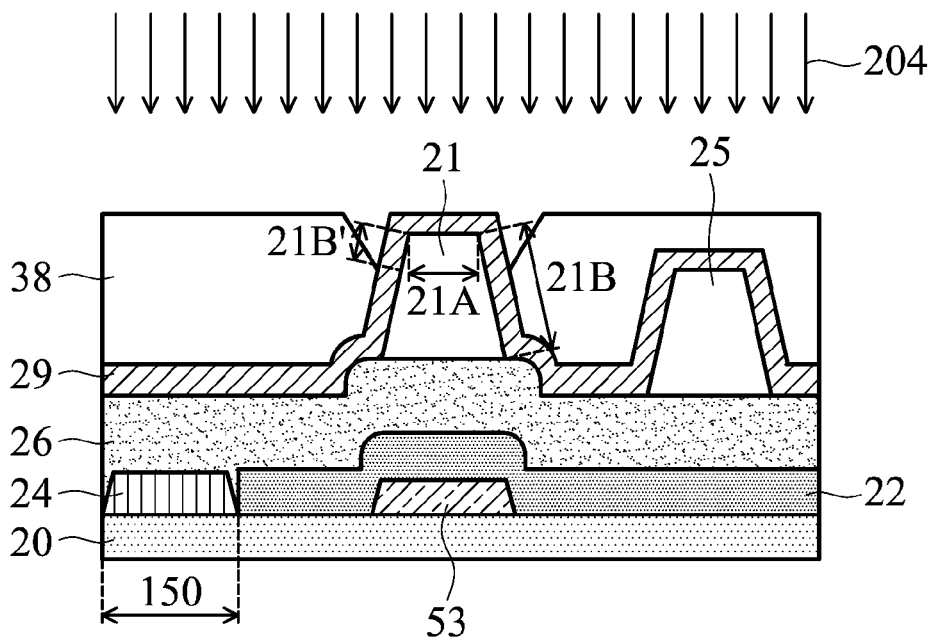

As shown in FIG. 5K, the exposed part of the conductive layer 29 is removed by an etching process 204, thereby exposing the top part 21A and the part of the upper side 21B' of the side 21B of the main spacer 21. The exposed part of the upper side 21B' and the total side 21B have a ratio of 10:100 to 90:100 (21B'/21B=10%~90%), preferably 60:100 to 80:100 (21B'/21B=60%~80%). The etching process 204 includes dry etching and/or wet etching.

In another embodiment, the photoresist layer 38 in FIG. 5I only covers the conductive layer 29 on the sensor spacer 25 and exposes the conductive layer 29 on the top part 21A and the part of the upper side 21B' of the side 21B of the main spacer 21. The etching process 204 in FIG. 5K can remove the exposed part of the conductive layer 29 to expose the top part 21A and the part of the upper side 21B' of the side 21B of the main spacer 21, and the exposure and development processes 202 in FIG. 5J can be eliminated. The etching process 204 is similar to that in FIG. 2H and omitted here for brevity.

Figure 5L:
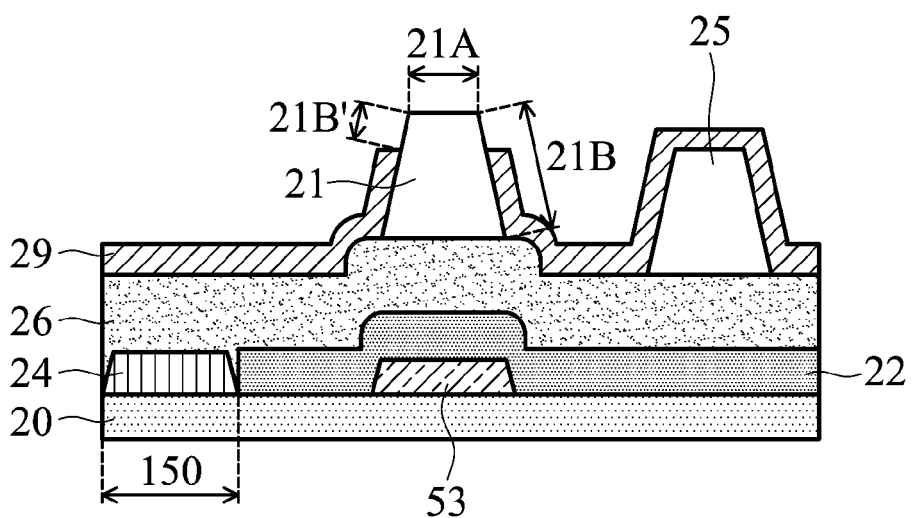

As shown in FIG. 5L, the photoresist layer 38 is removed. The removal of the photoresist layer 38 can be by stripping or ashing process. Similar to the structure in FIG. 2I, the exposed part of the upper side 21B' and the total side 21B have a ratio of 10:100 to 90:100, preferably 60:100 to 80:100. As described above, the removal of the conductive layer 29 on the top part 21A and the part of the upper side 21B' of the side 21B of the main spacer 21 may completely remove the conductive layer 29 on the top part 21A. In addition, the remaining part of the conductive layer 29 on the lower part of the side 21B of the main spacer 21 are used to avoid reducing aspect ratio from over removing the conductive layer 29 on the color filter 24.

Figure 5M:
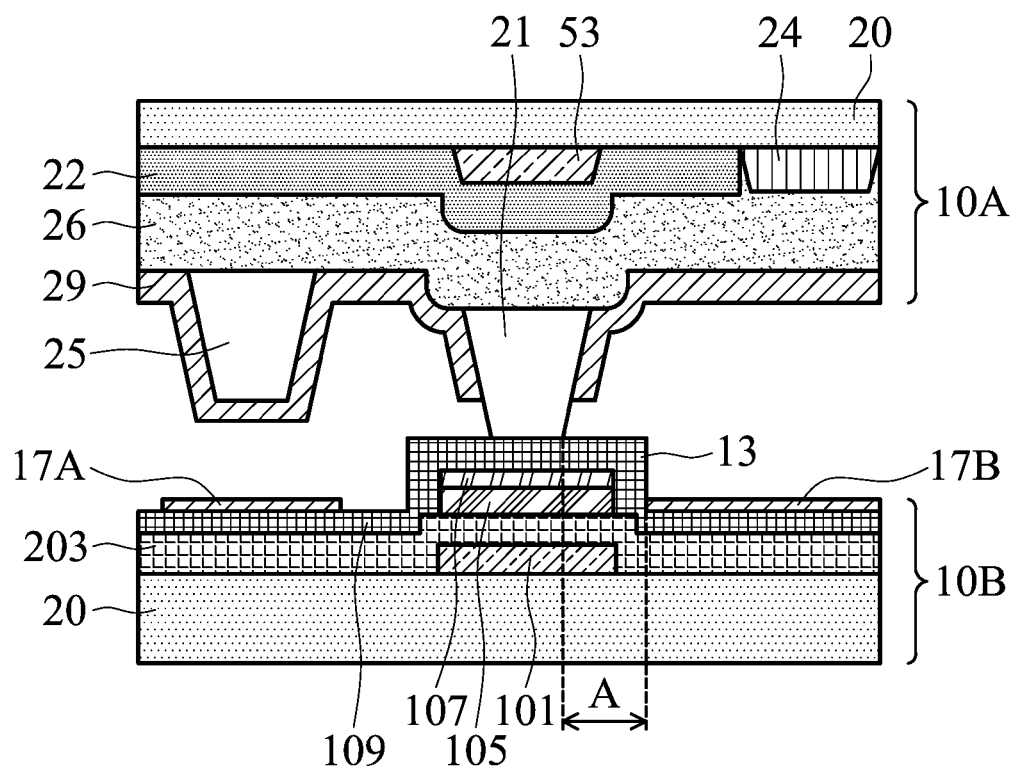

As shown in FIG. 5M, the color filter substrate 10A in FIG. 5L is combined with the array substrate 10B to complete a so-called in-cell touch panel. In one embodiment, the conductive layer 29 can be opaque metal such as Ti, Ta, Ag, Au, Pt, Cu, Al, Mo, Nd, W, Cr, Rh, Re, Ru, Co, other suitable metals, alloys thereof, or multi-layered structures thereof. The conductive layer 29 can be transparent metal material such as ITO, IZO, AZO, or composites thereof. The conductive layer 29 can be formed by CVD, sputtering, evaporation, screen-printing process, or the likes. Note that the conductive layer 29 and the common electrode (not shown) can be formed in same or different steps from same or different materials.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing a touch panel, comprising:
providing a substrate;
forming a photospacer layer on the substrate;
performing a single lithography process to the photospacer layer for defining a main spacer and a sensor spacer;
forming a conductive layer on the main spacer and the sensor spacer; and
removing a part of the conductive layer to expose a top part and a part of a upper side of the main spacer,
wherein the exposed part of upper side and the total side of the main spacer have a ratio of 10:100 to 90:100.

2. The method as claimed in claim 1, wherein the substrate is a color filter substrate or a color filter on array (COA) substrate.

3. The method as claimed in claim 2, wherein the substrate comprises a black matrix, and the main spacer and the sensor spacer are formed on the black matrix.

4. The method as claimed in claim 1, further comprising a step for forming an overcoat layer on the substrate before the step for forming the photospacer layer on the substrate.

5. The method as claimed in claim 1, wherein the photospacer layer is a positive type, the single lithography process utilizes a halftone photo mask, and the halftone photo mask has a transparent region, a semi-transparent region, and an opaque region, wherein the photospacer layer corresponding to the opaque region defines the main spacer, the photospacer layer corresponding to the semi-transparent region defines the sensor spacer, and the main spacer and the sensor spacer have different heights.

6. The method as claimed in claim 1, wherein the photospacer layer is a negative type, the single lithography process utilizes a halftone photo mask, and the halftone photo mask has a transparent region, a semi-transparent region, and an opaque region, wherein the photospacer layer corresponding to the transparent region defines the main spacer, the photospacer layer corresponding to the semi-transparent region defines the sensor spacer, and the main spacer and the sensor spacer have different heights.

7. The method as claimed in claim 1, further comprising a bedding layer disposed between the main spacer and the substrate.

8. The method as claimed in claim 7, wherein the bedding layer comprises color filter, insulation layer, metal layer, or combinations thereof.

9. The method as claimed in claim 1, wherein the exposed part of upper side and the total side of the main spacer have a ratio of 60:100 to 80:100.

10. A touch panel, comprising:
a substrate;
a main spacer and a sensor spacer on the substrate; and
a conductive layer covering the sensor spacer,
wherein the conductive layer only covers a part of a lower side of the main spacer, and does not cover a top part and a part of a upper side of the main spacer,
wherein the part of upper side not covered by the conductive layer and the total side of the main spacer have a ratio of 10:100 to 90:100.

11. The touch panel as claimed in claim 10, wherein the substrate is a color filter substrate or a color filter on array (COA) substrate.

12. The touch panel as claimed in claim 11, wherein the substrate further comprises a black matrix to separate a plurality of color filters, and the main spacer and the sensor spacer are formed on the black matrix.

13. The touch panel as claimed in claim 10, further comprising an overcoat layer disposed between the substrate and the main spacer, and between the substrate and the sensor spacer.

14. The touch panel as claimed in claim 10, wherein the main spacer and the sensor spacer have different heights.

15. The touch panel as claimed in claim 10, further comprising a bedding layer disposed between the main spacer and the substrate.

16. The touch panel as claimed in claim 15, wherein the bedding layer comprises color filter, insulation layer, metal layer, or combinations thereof.

17. The touch panel as claimed in claim 10, wherein the part of upper side not covered by the conductive layer and the total side of the main spacer have a ratio of 60:100 to 80:100.

* * * * *